United States Patent [19]
Miller et al.
[11] 3,886,323
[45] May 27, 1975

[54] METHOD AND APPARATUS FOR TESTING COMMUNICATIONS SWITCHING SYSTEM SPACE DIVIDED EQUIPMENT SUPERVISORY DEVICES

[75] Inventors: Howard R. Miller, College Station, Tex.; Leo J. Putchinski, Jr., Wheeling, Ill.

[73] Assignee: GTE Automatic Electric Laboratories Incorporated, Northlake, Ill.

[22] Filed: Feb. 27, 1974

[21] Appl. No.: 446,548

[52] U.S. Cl. .......... 179/175.2 R
[51] Int. Cl. .......... H04m 3/26
[58] Field of Search. 179/175.2 R, 175.23, 175.2 C; 340/172.5

[56] References Cited

UNITED STATES PATENTS

| | | | |
|---|---|---|---|
| 3,299,220 | 1/1967 | Wedmore | 179/175.2 R |
| 3,446,921 | 5/1969 | Denend | 179/175.23 |
| 3,626,383 | 12/1971 | Oswald et al. | 179/175.2 R |

*Primary Examiner*—Kathleen H. Claffy
*Assistant Examiner*—Douglas W. Olms

[57] ABSTRACT

A method and apparatus for testing a plurality of space-divided equipment units, such as junctors, of a communication switching system having a switching network for establishing connections between calling and called lines in response to common equipment including a scanner for monitoring supervisory devices of the space-divided units for supervisory purposes, such as ticketing calls through the network, includes establishing a test connection through the network between a test circuit and a supervisory device under test, causing the test circuit to control the operation of the device under test, causing the scanner to sense the operation of the device under test, and determining whether the device under test is able to operate properly in response to the scanner.

6 Claims, 12 Drawing Figures

METHOD AND APPARATUS FOR TESTING COMMUNICATIONS SWITCHING SYSTEM SPACE DIVIDED EQUIPMENT SUPERVISORY DEVICES

BACKGROUND OF THE INVENTION

1. Field of the Invention

The present invention relates to a method and apparatus for in-circuit testing of communication switching system supervisory devices which generate supervisory signals, such as ticketing signals, for processing by system common equipment.

2. Description of the Prior Art

Communication switching systems, such as electronic telephone systems, have employed switching networks for establishing selectively connections between calling and called lines in response to common equipment. Such systems also include a plurality of space-divided equipment units communicating with the common equipment for performing control operations in establishing the connections. One example of a control operation is the provision of supervisory signals, such as ticketing information signals, for billing purposes or for peg counting the number of calls. The common equipment includes a scanner for monitoring supervisory devices of the space-divided units generating the supervisory signals. It would be highly desirable to have a method and apparatus for testing the supervisory devices of the space-divided units to determine whether or not they are operating satisfactorily, since such devices provide critical information, such as billing information which must be accurate at all times or else the subscribers to the system may be billed incorrectly. Moreover, the tests of the devices should be performed in circuit, that is, with the device under test connected in the system and tested by other call processing circuits, since it would not be desirable to provide additional sensing circuits for each device due to the additional expense and the added risk of having the sensing circuits malfunction.

SUMMARY OF THE INVENTION

Therefore, it is the principal object of the present invention to provide a new and improved method and apparatus for testing communication switching system space-divided unit supervisory devices in an in-circuit manner and in an efficient and economical manner.

CROSS-REFERENCES TO RELATED APPLICATIONS

The preferred embodiment of the invention is incorporated in a COMMUNICATION SWITCHING SYSTEM WITH MARKER, REGISTER, AND OTHER SUBSYSTEMS COORDINATED BY A STORED PROGRAM CENTRAL PROCESSOR, U.S. Pat. application Ser. No. 130,133 filed Apr. 1, 1971 by K. E. Prescher, R. E. Schauer and F. B. Sikorski now abandoned, and a continuation-in-part thereof Ser. No. 342,323 filed Mar. 19, 1973 issued on Sept. 10, 1974, as U.S. Pat. No. 3,835,260, hereinafter referred to as the SYSTEM application. The system may also be referred to as No. 1 EAX or simply EAX.

The memory access, and the priority and interrupt circuits for the register-sender subsystem are covered by U.S. Pat. application Ser. No. 139,480 filed May 3, 1971 now U.S. Pat. No. 3,729,715, issued Apr. 24, 1973 by C. K. Buedel for a MEMORY ACCESS APPARATUS PROVIDING CYCLIC SEQUENTIAL ACCESS BY A REGISTER SUBSYSTEM AND RANDOM ACCESS BY A MAIN PROCESSOR IN A COMMUNICATION SWITCHING SYSTEM, hereinafter referred to as the REGISTER-SENDER MEMORY CONTROL patent application. The register-sender subsystem is described in U. S. Pat. application Ser. No. 201,851 filed Nov. 24, 1971 now U.S. Pat. No. 3,737,873 issued June 5, 1973 by S. E. Puccini for DATA PROCESSOR WITH CYCLIC SEQUENTIAL ACCESS TO MULTIPLEXED LOGIC AND MEMORY, hereinafter referred to as the REGISTER-SENDER patent application. Maintenance hardware features of the register-sender are described in four U.S. Pat. applications having the same disclosure filed July 12, 1972, Ser. No. 270,909 now U.S. Pat. No. 3,784,801, issued Jan. 8, 1974 by J. P. Caputo and F. A. Weber for a DATA HANDLING SYSTEM ERROR AND FAULT DETECTING AND DISCRIMINATING MAINTENANCE ARRANGEMENT, Ser. No. 270,910, now U.S. Pat. No. 3,783,255, issued Jan. 1, 1974 by C. K. Buedel and J. P. Caputo for a DATA HANDLING SYSTEM MAINTENANCE ARRANGEMENT FOR PROCESSING SYSTEM TROUBLE CONDITIONS, Ser. No. 270,912 now U.S. Pat. No. 3,805,038 issued Apr. 16, 1974 by C. K. Buedel and J. P. Caputo for a DATA HANDLING SYSTEM MAINTENANCE ARRANGEMENT FOR PROCESSING SYSTEM FAULT CONDITIONS, and Ser. No. 270,916 now U.S. Pat. No. 3,783,256, issued Jan. 1, 1974 by J. P. Caputo and G. O'Toole for a DATA HANDLING SYSTEM MAINTENANCE ARRANGEMENT FOR CHECKING SIGNALS, these four applications being referred to hereinafter as the REGISTER-SENDER MAINTENANCE patent applications.

The marker for the system is disclosed in the U.S. Pat. No. 3,681,537, issued Aug. 1, 1972 by J. W. Eddy, H. G. Fitch, W. F. Mui and A. M. Valente for a MARKER FOR COMMUNICATION SWITCHING SYSTEM, and U.S. Pat. No. 3,678,208, issued July 18, 1972 by J. W. Eddy for a MARKER PATH FINDING ARRANGEMENT INCLUDING IMMEDIATE RING; and also in U.S. Pat. applications Ser. No. 281,586 filed Aug. 17, 1972 by J. W. Eddy for an INTERLOCK ARRANGEMENT FOR A COMMUNICATION SWITCHING SYSTEM now U.S. Pat. No. 3,806,659, issued Apr. 23, 1974, Ser. No. 311,606 filed Dec. 4, 1972 by J. W. Eddy and S. E. Puccini for a COMMUNICATION SYSTEM CONTROL TRANSFER ARRANGEMENT now U.S. Pat. No. 3,830,983, issued Aug. 20, 1974, Ser. No. 303,157 filed Nov. 2, 1972 by J. W. Eddy and S. E. Puccini for a COMMUNICATION SWITCHING SYSTEM INTERLOCK ARRANGEMENT now U.S. Pat. No. 3,809,822, issued May 7, 1974, hereinafter referred to as the MARKER patents and applications.

The communication register and the marker transceivers are described in U.S. Pat. application Ser. No 320,412 filed Jan. 2, 1973 by J. J. Vrba and C. K. Buedel for a COMMUNICATION SWITCHING SYSTEM TRANSCEIVER ARRANGEMENT FOR SERIAL TRANSMISSION now U.S. Pat. No. 3,814,859, issued June 4, 1974, hereinafter referred to as the COMMUNICATION REGISTER patent application.

The executive program for the data processor unit is disclosed in U.S. Pat. application Ser. No. 347,281 filed Apr. 2, 1973 by C. A. Kalat, E. F. Wodka, A. W. Clay and P. R. Harrington for a STORED PROGRAM CON TROL IN A COMMUNICATION SWITCHING SYSTEM, hereinafter referred to as the EXECUTIVE PROGRAM patent application.

The computer third party circuit is disclosed in U.S. Pat. application Ser. No. 348,575, filed Apr. 6, 1973 for a DATA PROCESSOR SYSTEM DIAGNOSTIC ARRANGEMENT by L. V. Jones, et al., hereinafter referred to as the THIRD PARTY patent application. The data processor system localization program is disclosed in U.S. Pat. application Ser. No. 348,541, filed Apr. 6, 1973 for a "METHOD OF LOCALIZING THE CAUSES OF MALFUNCTIONS OCCURRING IN A DATA PROCESSOR SYSTEM by P. J. Keehn, R. C. Wegner, D. C. Robbins, D. Chang, W. K. Yuan and J. L. Clements, hereinafter referred to as the COMPUTER LOCALIZATION PROGRAM patent application.

The automatic test system for the system is disclosed in the following United States patent applications: H. R. Miller, L. J. Putchinski, and K. W. Vanderlei application Ser. No. 446,437, filed Feb. 27, 1974 H. R. Miller, L. J. Putchinski, K. W. Vanderlei and D. A. Heck application Ser. No. 446,433, filed Feb. 27, 1974; T. W. Crosley, H. R. Miller and L. J. Putchinski application Ser. No. 446,574, filed Feb. 27, 1974; L. J. Putchinski, H. R. Miller and K. W. Vanderlei application Ser. No. 446,576, filed Feb. 27, 1974; and H. R. Miller and T. W. Crosley application Ser. No. 446,575, filed Feb. 27, 1974.

The above system, register-sender, marker communication register, executive program, third party, computer localization program and automatic test system patents and applications are incorporated herein and made a part hereof as though fully set forth.

DESCRIPTION OF THE PREFERRED EMBODIMENT

Figure 1:
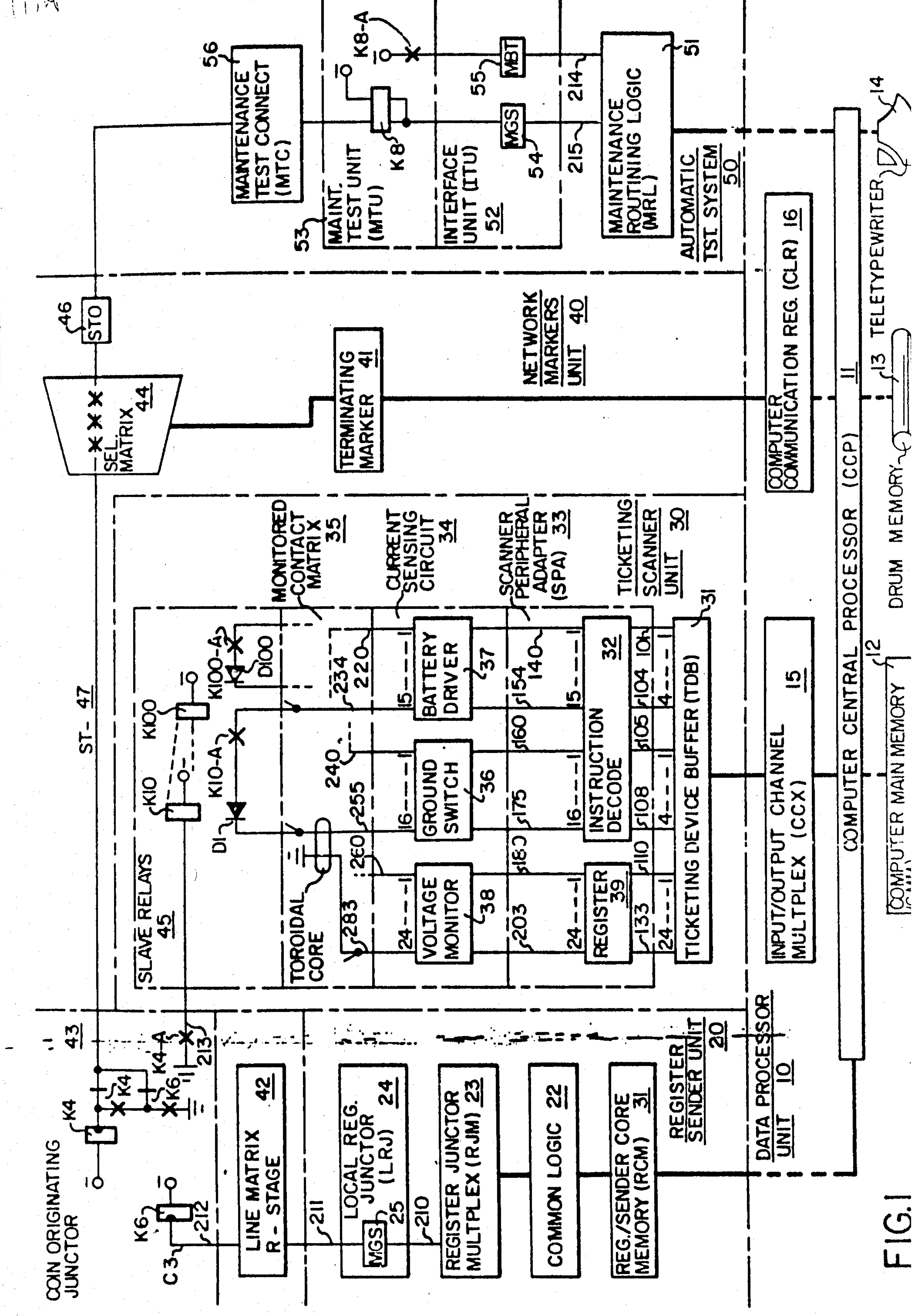
FIG. 1 is a simplified symbolic and functional block diagram of a communication switching system incorporating the principles of the present invention.

Referring now to FIG. 1, there is shown a data processing unit 10 which serves as the central coordinating unit and communication hub in a communication switching system, only a portion of which is shown in FIG. 1. The system of FIG. 1 is more fully described in the above-cited patents. A central processor 11 is the central control unit of the computer for obtaining program instructions stored in a main memory 12, interpret each instruction, and perform the necessary operations specified by the instruction. The CMM memory 12 stores the system control program, referred to as the system executive program as well as those application programs whose frequency of usage requires that they be locally available. A drum memory 13 provides mass storage for translation data, diagnostic programs, tables and other such information. An input/output device buffer provides the central processor with serial and/or parallel information concerning its associated teletypewriter device 14.

A register/sender unit 20 is a time-shared common control unit with the ability to register and process a large number of calls simultaneously from local lines or incoming trunks. A register/sender core memory RCM 21 stores digits to be received and send, and supervisory information pertaining to the call. A common logic 22 contains the control logic for call processing by the register/sender. A register junctor multiplex RJM 23 provides an interface between the space-divided register junctors 24 and the time-shared common logic 22. This multiplex converts time-shared signals to space-divided signals for controlling the register junctors and the register/sender RJM multiplexer space-divided signals for return to the common logic. The local register junctor 24, which is one of a maximum 192 register junctors, the others not being shown, is the entry and exit point in the register/sender for information signalled through the switching network. It provides a facility for dial pulse sending and receiving, dial tone, other signalling previously disclosed, and interface between the common logic and switching network and markers. Signals from lines and network circuits are received by the register junctor and forwarded to the common logic for processing.

A ticketing scanner unit 30 is a data gathering and reporting system used for customer billing, toll separation, traffic engineering studies, planning and evaluation of toll services and maintenance of toll facilities. A ticketing device buffer 31 provides the input/output interface for the ticketing scanner unit to the data processor unit 10 for serving one of four peripheral adapters at a time. All interrupts and all data and instructions are routed through the buffer TDB, there being only one error interrupt and one ready interrupt associated with the TDB buffer 31. The TDB data channel comprises 24 bits plus a parity bit, the parity bit being checked or generated according to the direction of transmission. The TDB buffer is equipped in duplicate, each unit serving one of a duplicate scanner unit and one of a duplicated pair of magnetic tape units. In normal operation, one TDB buffer is used to service the input/output operation to one scanner unit and the other TDB buffer services the duplicate magnetic tape unit. This arrangement is switched on alternate days. The ticketing device buffer provides intermediate reception and storage of instruction and data information from the central processor to a peripheral adapter. The TDB buffer also provides checking facilities in the form of a parity check on a computer word and a 1 of N check on computer directives. A scanner peripheral adapter 33 receives data in a one computer work grouping of 24 bits from the central processor. The peripheral adapter interprets instructions received from the central processor via the TDB buffer into bytes for enabling one of fifteen battery drivers and one of sixteen ground switches in a current sensing circuit 34, which also includes 24 voltage monitors for retrieving groups of 24 contacts via toroidal core sense rings in a monitored contacts matrix 35. The matrix includes a three dimensional scanning matrix for interrogating contacts associated with supervisory circuits, such as originating junctors, incoming trunks and outgoing trunks. The monitored contacts matrix provides isolation between the electronic scanner SPA and the electromechanical, high voltage and noise logic circuits of a slave relay circuit 45, which provides contact isolation from the ticketed originating junctor circuits, such as the coin originating junctor 43, required for scanning purposes, all of the other types and kinds of originating junctors not being shown in the drawings. Complete flexibility is available via a distribution grouping of terminals such that any supervisory circuit can be scanned, up to a maximum of 5,760 scan points. Each junctor OJ or incoming trunk requires one scan point, while each outgoing trunk requires two scan points.

A switching network-markers unit 40 provides access into the communication switching system with high speed control to connect any call through the system to the desired destination. A terminating markers 41 of the network-marker units 40 include electronic logic circuits which control the selection of idle paths and the establishment of connections through the matrices, such as the selector matrix 44, of the network-markers unit 41. A line matrix R-stage 42 provides aa concentrating matrix that allows the originating junctors to access lesser local register junctors LRJ. The coin originating junctor 43 is used for a call initiated from a regular line and for every call originated from a local paystation line (not shown), and remains in the connection for the duration of the call. The coin originating junctor extends signalling path of the calling line to the register junctor 24 in the register/sender unit 20, and at the same time provides a separate signalling path from the register junctor to the selector matrix 44. The coin originating junctor maintains the calling line, either a paystation or a regular line, isolated until cut-through is effected, at which time the calling party is switched through to the selector matrix inlet. The selector matrix 44 provides for intermediate mixing and distribution of the traffic from various trunks and junctors on its inlets to various trunks and junctors on its outlets. This three-stage network interconnects originating junctors and other equipment with special local facilities to a selector test outlet STO circuit 46 for access into the automatic test system 50.

Associated with the data processor, but as a separate equipment group, is the automatic test system 50, which serves as a centralized facility for interfacing between the maintenance personnel referred to as the "office craftsman" and the communication switching system and is the focal point for initiating test call routines and test programs, providing print-out of maintenance information, and provides special test equipment that are used in automatic testing in the exchange area. This equipment is used to test the trunks residing in the local office and testing of customer's lines served by an office located beyond the supervisory limits of the local test trunks in the main office. The maintenance routining logic unit 51 contains the electronic circuitry to provide sequence routining control for automatic testing of a communication switching system. The interface unit ITU 52 provides the necessary buffer logic from gates 54 and 55 between the electronic circuitry of the maintenance routining logic 51 and the electromechanical circuitry of the maintenance test unit MTU 53, which provides various circuits needed to generate and receive signals as indicated by relay coil K8, for routining the space-divided equipment, and also to simulate other conditions necessary to complete the tests. The maintenance test connect circuit MTL 56 is an electromechanical single-stage switching network, which concentrates all of the test inlets and outlets of the network used for automatic testing into four unique circuits, one of which is desceibed herein, namely th selector test outlet 46.

Referring now to FIG. 1, peripheral adapter registe circuit 39 controls twenty-four data bits to be read b the computer central processor via the ticketing devic buffer from the current sensing circuit 34, which ir cludes 24 voltage monitor circuits 38, and sixtee ground switches 36 and fifteen battery drivers 37 to er able the monitored contacts matrix toroidal core: which monitors a large group of contacts from a slav relay circuit 45, which in turn are each operated fror a coin originating junctor via contact K4-A from rela K4, which is energized from ST lead 47 from the autc matic test system interface unit.

Briefly, in operation, the scanner peripheral adapte instruction decode circuit 32, which controls the re trieving of data from the monitored contacts matrix, i supplied with sufficient address information from th system central processor on leads 101 through 104 an leads 105 through 108 to enable one of fifteen batter drivers 37 on leads 140 through 154 and enable one c sixteen ground switches 36 on leads 160 through 17: which in turn enables a current to flow through one c many contacts, such as contacts K10-A through K10C A. A set of relays K10–K100 controlling the respectiv contacts K10-A through K100-A are enabled by th coin originating junctor 43, which is one of a maximur of 2,880 coin originating junctors, the other ones c which not being shown in the drawings. The junctor 4 includes, among other components (not shown), tw relays, K4 and K6, but it is to be understood that othe relays (not shown) are required to perform the norm: coin OJ operation. The coin OJ relay coils K4 and K are operated to check either the normal ticketing fun tion or the paystation control function respectivel which operation results in the closure of relay conta K4-A, which in turn is monitored by causing the oper: tion slave relay K10 of the slave relays K10 throug K100. The monitored contacts matrix toroidal core whose outputs are sensed by one of twenty-four voltag monitor gates 38, enable leads 180 through 203 to tl 24 bit register circuit 39 in the scanner peripher adapter, which in turn supplies a full computer word 24 bits on leads 110 through 133 to be read by the cor puter central processor 11 via the ticketing device bu fer 31.

Referring now to the arrangement of the present i vention in greater detail, the scanner peripher adapter register circuit 39 has twenty-four output lea 110 through 133 connected to the ticketing device bu fer for sending a full computer word of data to the ce tral processor and the input leads 180 through 203 the register are connected to the outputs of 24 volta monitor circuits 38. The voltage monitor circuits have its input leads 260 through 283 connected to large group of toroidal cores in the monitored conta matrix 35. A battery driver device 37 supplies t contacts of the slave relays via leads 220 through 2: and a ground switch device 36 via leads 160 throu 175, allows the current to flow through the contac and a diode in series with each contact for isolati from other current sources, and finally through the roidal core sensing elements. The cores operate as c rent transformers, with many single turn input windir and an output winding, which is used by the volta monitor devices 38. The matrix 35 reflects at every stant the status of the contacts that must be monitor for billing purposes. The battery driver 37 has 15 output leads 220 through 234 connected to the matrix, and has its 15 input leads 140 through 154 connected to the output instruction decode circuit 32, which in turn has its four inputs connected to the ticketing device buffer via leads 101 through 104. The ground switch circuit 36 has 16 output leads 240 through 255 connected to the matrix, and has 16 input leads 160 through 175 connected to the output of the instruction decode circuit, which in turn has its four inputs connected to the TDB 31 via leads 105 through 108. The voltage monitor device and main battery test gates designated MBT shown in the drawings are circuits, which when ground is applied to its input or its input is open circuited, supplies a true signal at its output, but when a negative battery potential is supplied thereto, a false indication is generated at its output. The ground switch device and the main ground switch relay driver illustrated in the drawings and designated ground switch and MGS respectively are electronic switches to provide a sink for a negative battery potential, which is sometimes supplied by a relay, and they may comprise two transistors (not shown) connected so that when a true signal is supplied at the input, a positive ground potential from the device is connected via the emitter-collector path of the output state in saturation to the negative battery source. The battery driver device shown in the drawing are electronic switches which are similar to the ground switch devices except that the battery devices switch negative battery potential as a source instead of a ground potential.

The slave relays K10 through K100 are a large group of relays which function to repeat the answer and hold operation of the coin originating junctors from the closure of the make contact of relay K4 for supplying a ground signal to the slave relays. The relay K4 is energized by ST lead 47, in normal operation from a terminating junctor upon detecting an answer supervision condition through the switching network, or from the automatic test system interface unit 52 via ground potential (not shown) supplied by MGS gate 54 for testing purposes. The relay K4, when operated, releases the ground potential through its normally closed contacts of its transfer contacts, but the ground potential remains on coil K4 via a path including the ST lead through the normally-closed contacts of the K6 relay transfer contacts and the normally-open contacts of the K4 relay transfer contacts. The relay coil K6 is energized for paystation type originations into the switching network from the C3 lead 212, which is energized by the output lead 211 of the MGS gate 25 via the line matrix R-stage 42 circuit. The MGS input lead 210 is enabled by the register sender common logic unit 22 through the register junctor multiplex 23. When relay K6 is energized, its normally-closed contacts release the ground potential from lead ST to relay K4 and supplies a holding ground potential to relay K4 via its normally-open contacts of its transfer contacts through the normally-open contacts of the operated transfer contacts of the relay K4 for supplying a ground holding potential for the relay K4.

Considering now a typical operation, assuming that the system has established a switching network test path to the coin originating junctor 43 and the other checks of the originating junctor operation have already been verified, after the proper system software operations have been performed for the terminating process through the network, the terminating marker 41 is instructed to set up a path from the selector matrix inlet associated with the coin originating junctor to the selector matrix outlet associated with the STO circuit, which has access to the automatic test system 50. After the path is pulled, the register/sender unit 20 is instructed by the system software via register sender core memory word storage area 2A of the register junctor time slot associated with the selected register junctor 24 to cut the coin originating junctor through to the STO circuit. The register sender common logic unit 22 enables MGS gate 25 in the LRJ circuit 24, which supplies a ground potential to energize the coin OJ relay coil K6, which closes its normally-open contacts and opens its normally-closed contacts of its transfer pair. The automatic test system 50 is then instructed from the system software via words A through F of the maintenance routining adapter input register to supply a holding potential to the relay K4 via lead ST. The MRL unit 51 receives this instruction and enables MGS gate 54 in the interface unit 52, which switches the ground potential through relay K8 in the MTU circuit 53 and onto the ST lead via the selector test outlet 46 and the selector matrix 44. Relay coil K4 operates and disconnects the ground potential from the ST lead by opening the normally-closed K4 contacts. The ST lead ground potential is also blocked by the normally-closed K6 contacts already being opened by the register/-sender. But, relay K4 remains operated from the closure of the normally-opened K4 contacts, which switches the ground potential that was already forwarded by the closure of the normally-opened K6 contact. Thus, relay K4 remains energized and its normally-opened contacts close to switch a ground potential to the slave relay K10. The system software then instructs the ticketing scanner unit 30 to monitor the status of slave relay K10 through the normally-opened contact K10-A of the relay K10. The scanner peripheral adapter instruction decode circuit 32 receives the X and Y instructions, which selects and enables the fifteenth battery driver lead 234 to switch a negative battery potential to the slave relay K10-A contacts, and the sixteenth ground switch lead 255 to provide a positive potential sink for the relay contacts K10-A to the negative source. A check is performed to insure that only one output signal of each one of the battery and ground devices has been activated. This check is necessary, since if more than one ground switch lead, for example, is switched on simultaneously, the current would flow between two groups of contacts and erroneous data would be returned. Current flows through the toroidal core only if the monitored contact K10-A is closed and its series isolation diode D1 is not open-circuited. The transformer type output lead 283 of the toroidal core supplies a true signal, which is sampled and the results of that scan, on a group of 24 contacts, are stored in the scanner peripheral adapter register 39 for transmission to the system program. A ready interrupt is generated and the system program collects the data to analyze its contents for closure of the monitored contacts. At the end of the scan cycle, the scanner clears itself in preparation for another cycle request. If the data indicates that a true signal was not true on lead 283, a trouble condition is output on the teletypewriter 14 indicating that this operation was not successful and either the coin originating junctor 43, slave relay K10, or monitored contacts matrix components did not operate properly. If no trouble condition was detected, the coin originating junctor is released by the system software instructing the MRL unit 51 to turn off MGS switch 54 and remove the ground potential from the ST lead 47, which should cause relay K4 to remain operated through the K4 relay contacts and the relay K6 contacts, as previously described, to ground potential. Several other relays (not shown herein) also operate to collect the coins from the paystation before the coin originating junctor is finally released from the call. The ticketing scanner unit 30 is again instructed by the system software to monitor the slave relay K10 operation and return its status to the computer central processor. Relay K4 should have remained operated and K4 relay make contacts should have closed to switch a ground potential to close relay K10. The release of the MGS unit 54 is verified by monitoring the release of MTU relay coil K8 through normally-opened contact K8-A from MBT gate 55 turning off and providing a false signal on its output lead 214 to the MRL unit 51. This status is checked by the system software, and if found to be false a trouble message is output. If the ST bad ground was released, then the status of the slave relay is checked. If the relay K10 has released, a trouble message is output indicating that the coin originating junctor has a faulty relay contact in the path from the relay K4 through its normally-opened contacts and relay K6 normally-open contacts to ground. Considering all checks to be verified in the coin originating junctor operation with a paystation type of line, the normal subscriber type of line operation remains to be verified with the coin originating junctor.

The register/sender unit 20 is instructed to release relay K6 by turning off MGS unit 25 in the register junctor 24, which removes a ground potential from lead 211. The coin originating junctor should now completely release from the call and become available for normal call processing. The system software then instructs the ticketing scanner unit 30 to monitor the operation of the slave relay K10 again and report the results to the central processor. The relay K4 normally-open contacts should return to this normal state, thus releasing slave relay K10, which opens its relay contacts K10-A. This status is monitored by the ticketing scanner unit and analyzed by the originating junctor routine module. If the data indicates that relay contacts K4-A have not opened, a trouble message is output to indicate that either the coin originating junctor 43, slave relay K10, or the monitored contacts matrix is at fault. When the relay K4 has been verified to have released, the system re-establishes a switching network path to the coin originating junctor 43 and the proper system translations have been performed for the terminating process through the network and the terminating marker establishes a selector matrix path to the STO circuit 46. The system software then instructs MRL unit 51 of the automatic test system to turn on MGS unit 54 to switch a ground potential on ST lead 47 to operate coin OJ relay K4. The relay K4 operates and causes its normally-closed contacts to open to attempt to release the ground to relay K4, but the path through the relay K6 normally-closed contacts and the relay K4 normally-opened contacts, which have closed, re-establishes the ground potential to relay K4. The status of slave relay K10 is monitored again as previously described and the results analyzed by system software. Any failure condition is output and finally the automatic test system is instructed to release the ST lead 47 ground potential, which drops relay K4 and subsequently the coin originating junctor.

Software Program Procedures

The automatic test system originating junctor test routining module OJ TEST-V57 provides routining, localization and repair verification of the three types of originating junctors OJ, regular, metering and coin, that can exist in a communication switching system. This disclosure is only concerned with the coin OJ operation and testing in the switching system. The disclosed method of testing the ticketing contacts of the coin OJ involves testing the junctor completely twice, once as a coin OJ application and once as a regular OJ in operation. This insures the full operational characteristics of the coin OJ have been verified due to the possible intermixing of paystation and non-paystation lines in the same line A-B group, which does not allow for the originating marker to select the proper OJ to match the application desired. This testing method is made possible by the fact that the coin OJ is designed to provide all the features of a regular OJ along with its expanded coin OJ requirements and as such should be tested as a regular OJ. Briefly, in operation, at the successful completion of the ATS test of OJ, OH, a check is made to determine if the OJ has ticketing contacts. If so, the contact status is examined via the ticketing scanner if the OJ is a metering or regular type. If the OJ type is coin, preparations are made to test the coin OJ as a Regular OJ. First the information identifying the OJ and ticketing contacts are copied out of the work area to a temporary storage area. The selector inlet information is then copied out of the AST routining table to temporary storage. The work area and ATS routining table are then cleared (set to zero). The pertinent information is then returned to the work area and routining table from the temporary. The ATS Main Test Mode and Sub-test Mode is then set to the values used for Regular OJ testing in the routining table. Finally an ATS software utility module is scheduled to clear the ATS hardware. In the process of clearing the ATS hardware the network paths required to test the coin OJ are dropped and the coin OJ is ready to test again. The return point specified to the utility module is the beginning of the OJ routining module, where the coin OJ is tested again as a regular OJ. This time the ticketing contacts are thoroughly tested. At the completion of the coin OJ test as a regular OJ, control is returned to the ATS control package which has been oblivious to the additional test.

Several system subroutines are called by V57-OJTEST, of which those pertinent to this disclosure are now provided.

1. Register sender access F08X02 — is used to read and read/modify/write into the register sender core memory.
2. Ticketing scanner unit input/output handler F72X01 — reads the status of the ticketing slave relays.
3. Ticketing seizure module T01X04 — insures that the ticketing contact is not being scanned by the hardware scanner.
4. Maintenance and control center input/output handler V01X05 — is used to read and write into the MRA register of the MRL.

5. Originating path setup V95X01 — is used to establish an originating path through the line matrix and OJ.
6. Terminating path setup V96X02 — is used to establish a terminating path through the selector matrix to an STO.
7. Maintenance routining logic sequence V27X02 and V27X04 — is used to either start or end the MRL sequence of operation, respectively.

System Operation

Figure 2:
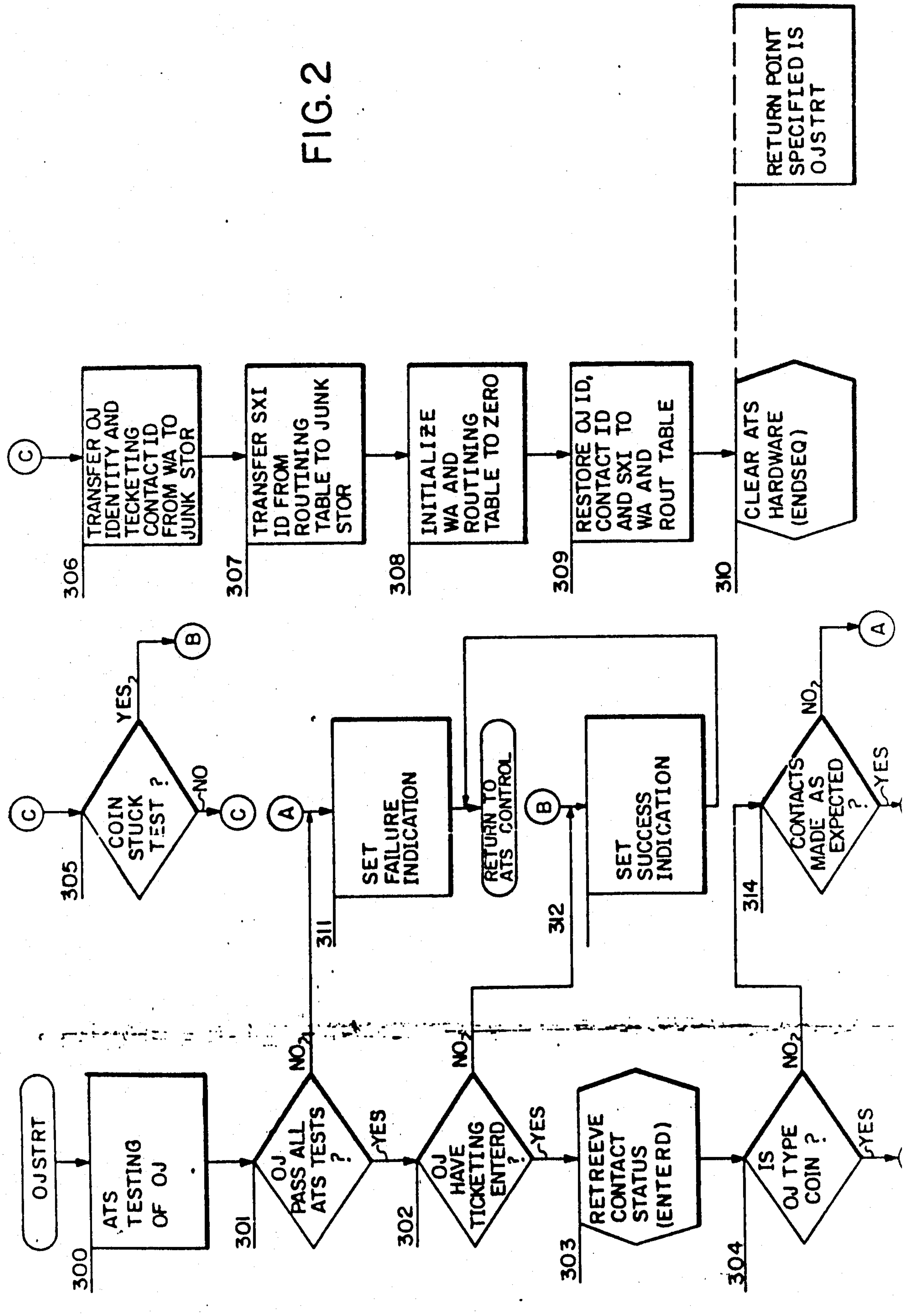
FIG. 2 is a block diagram flow chart of the method of the present invention.
Figure 3:
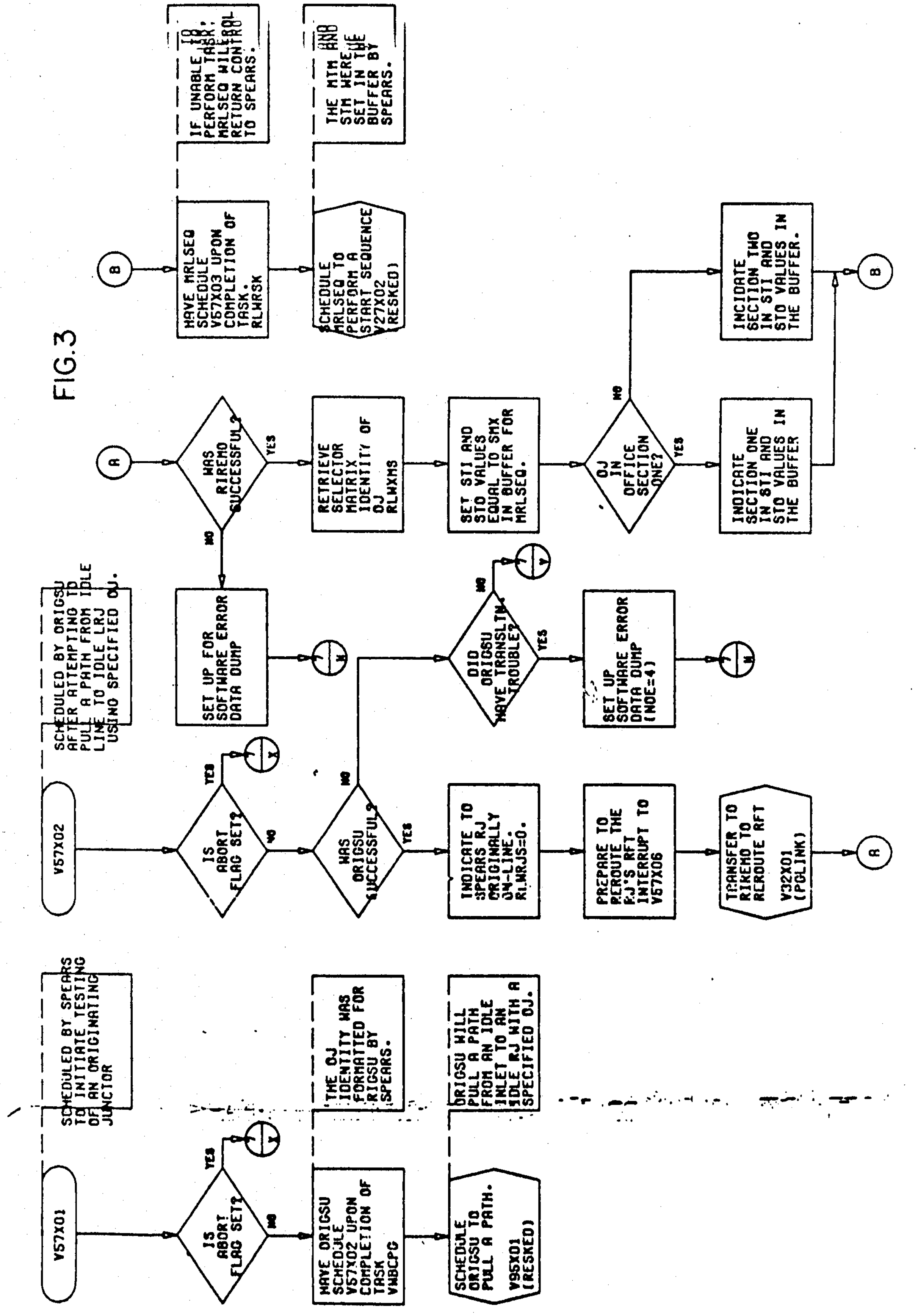
FIGS. 3–12 are flow chart diagrams of a software program for controlling the method and apparatus of the present invention.
Figure 4:
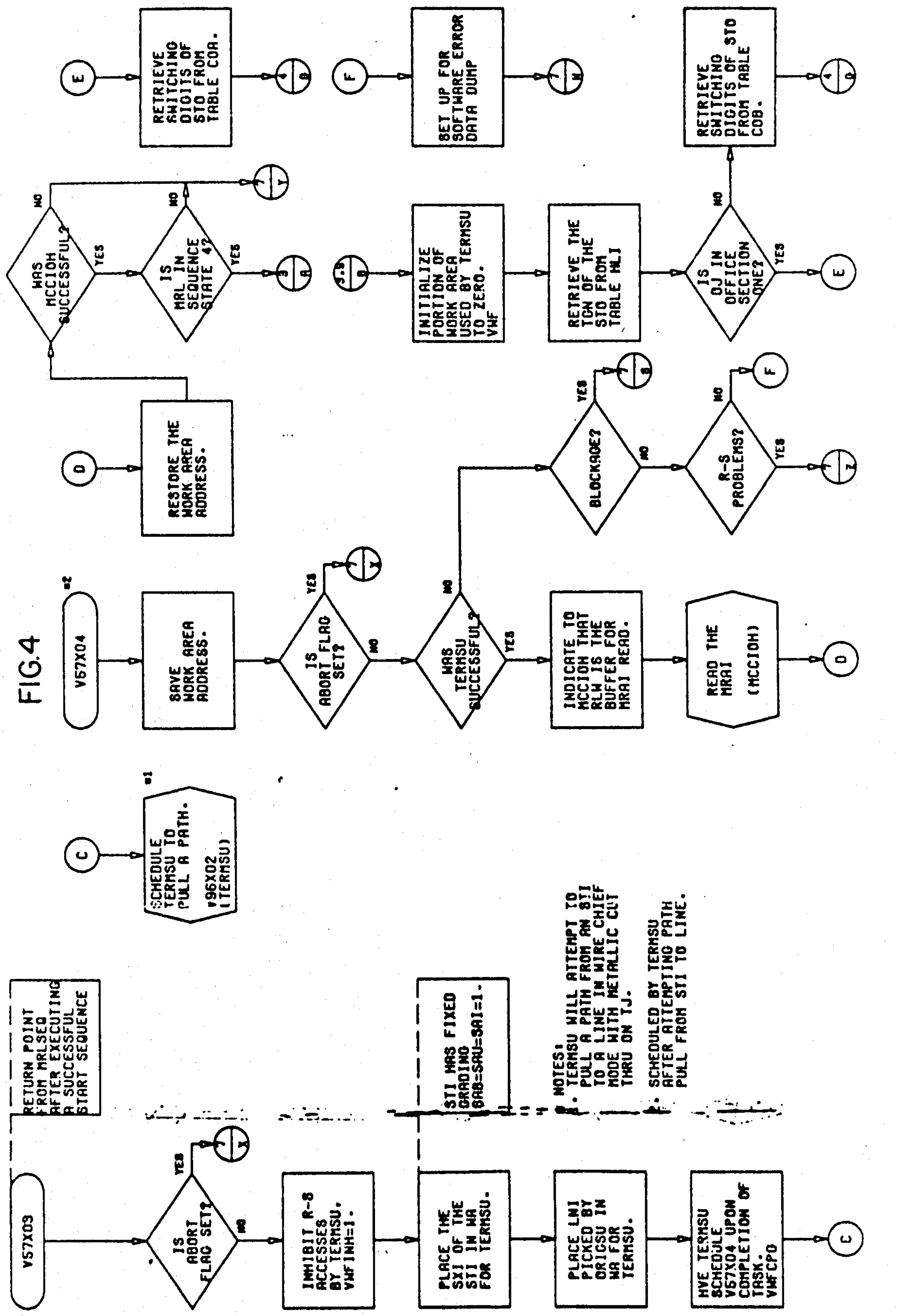
Figure 5:
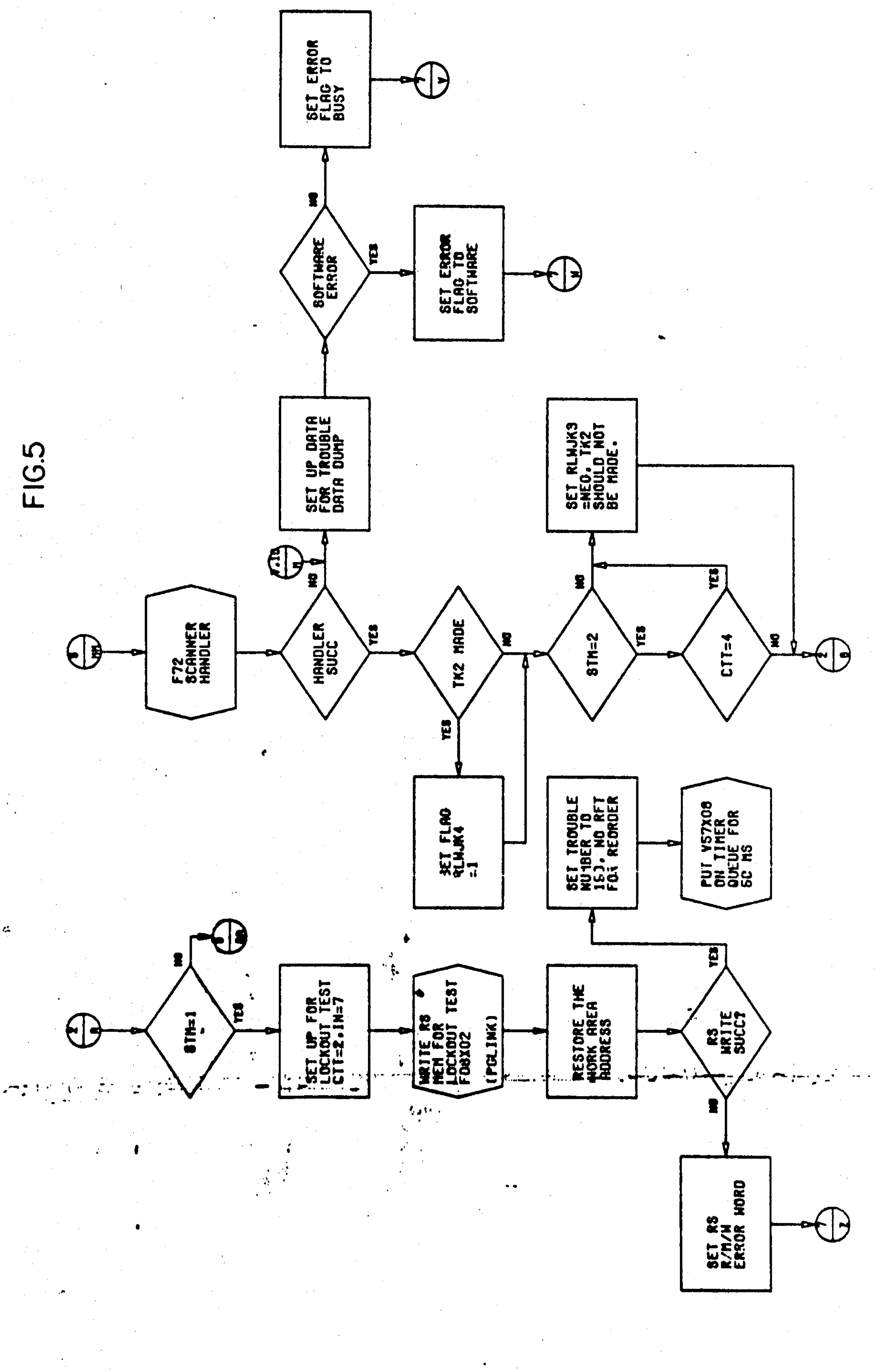
Figure 6:
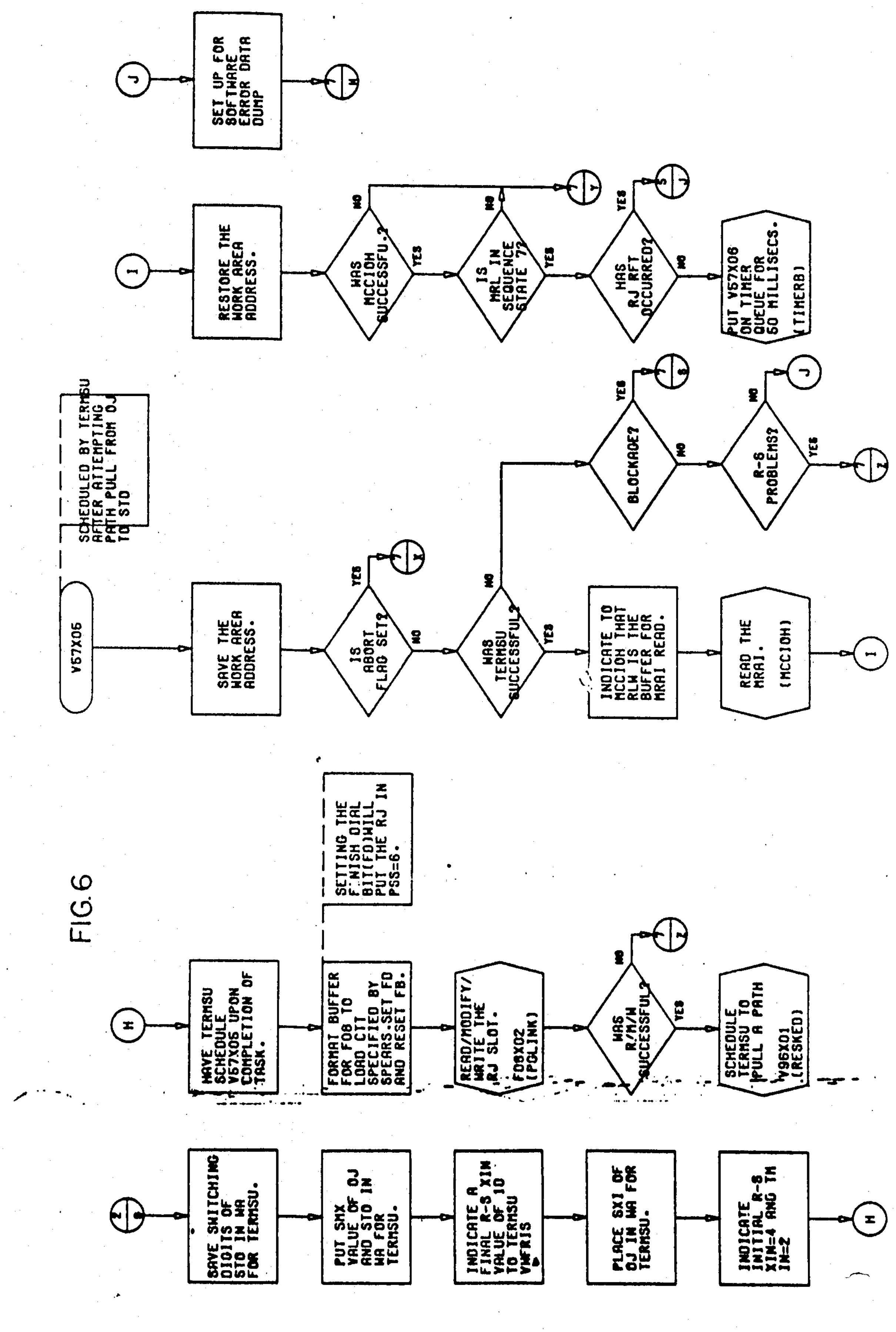
Figure 7:
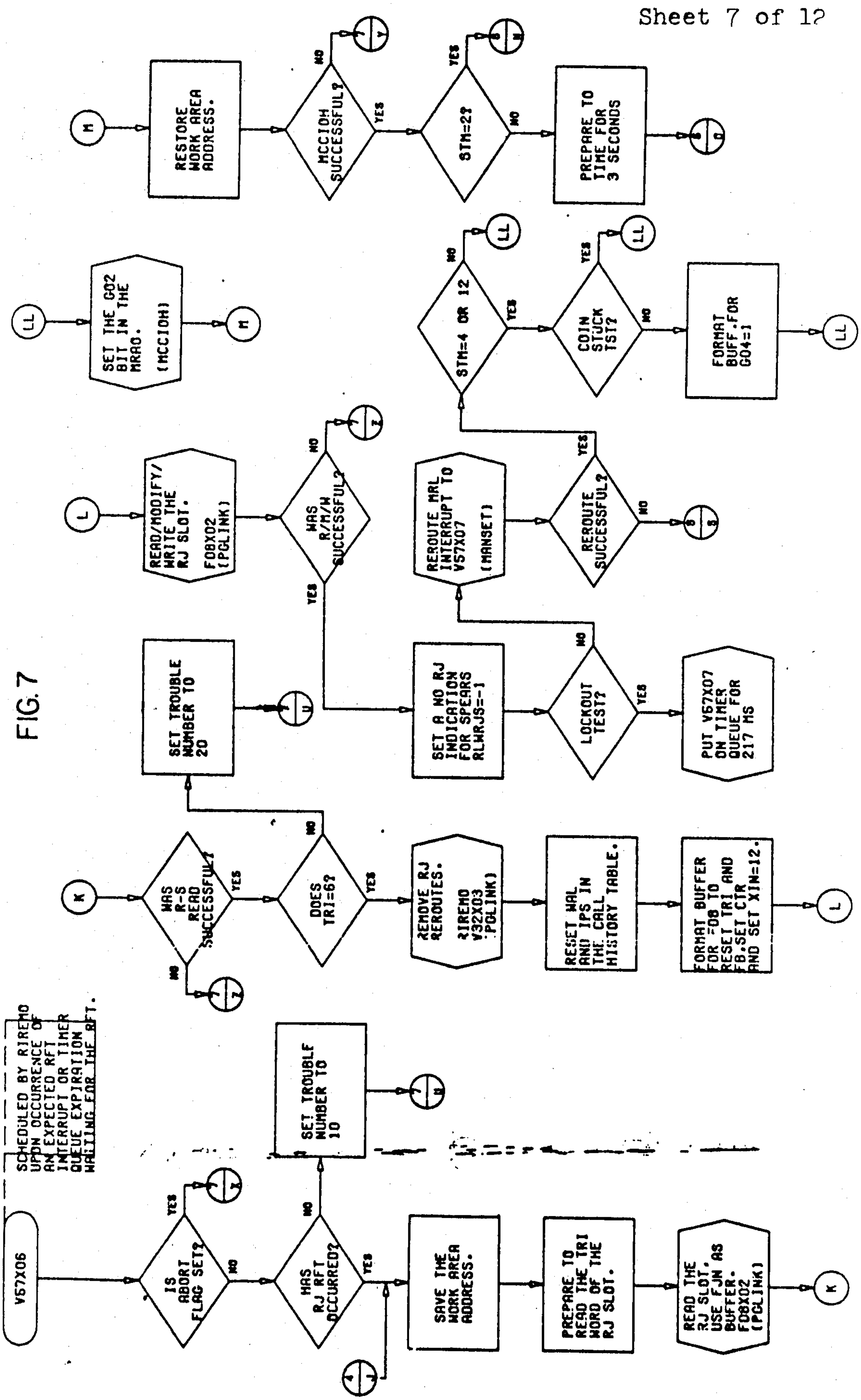
Figure 8:
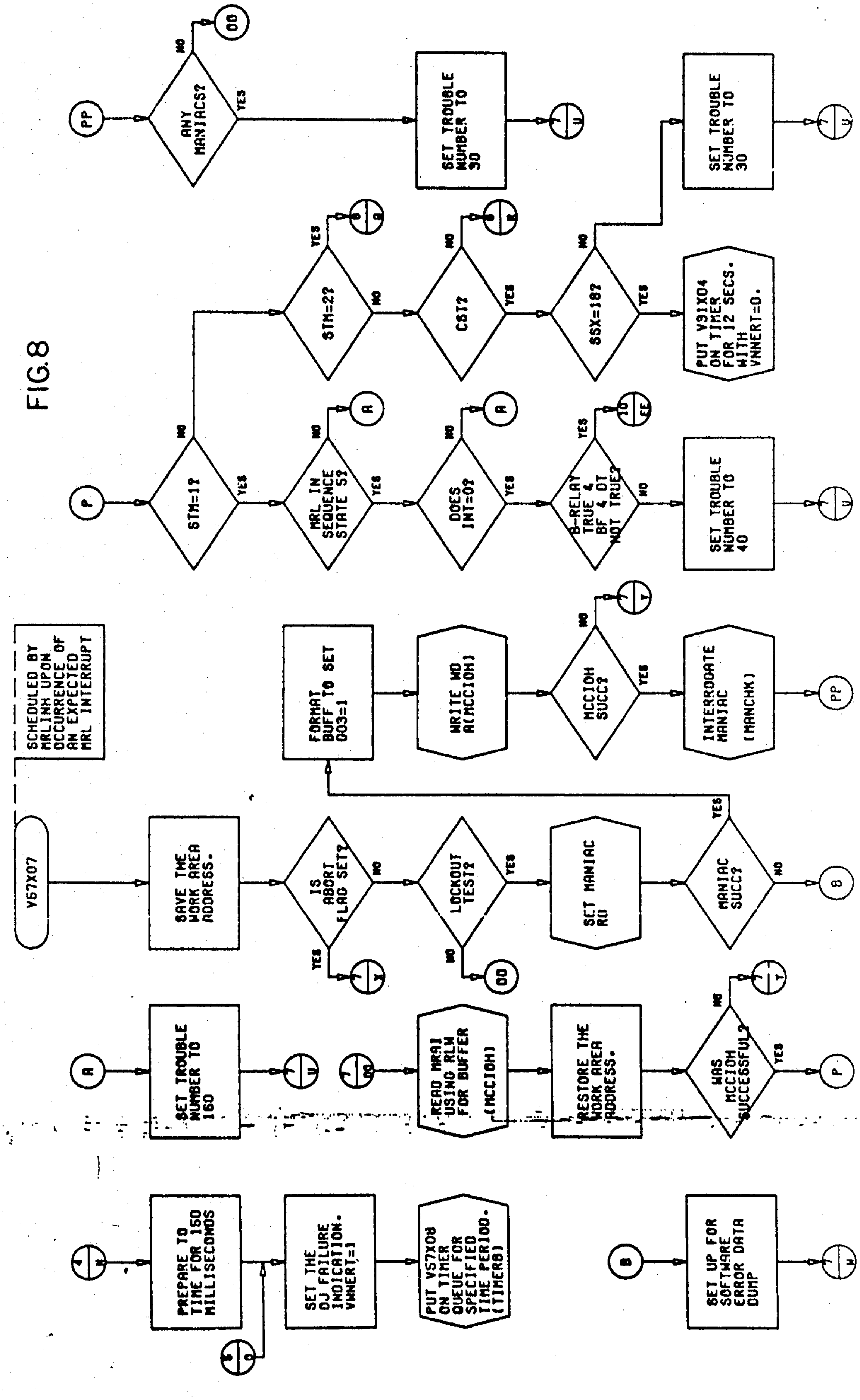
Figure 9:
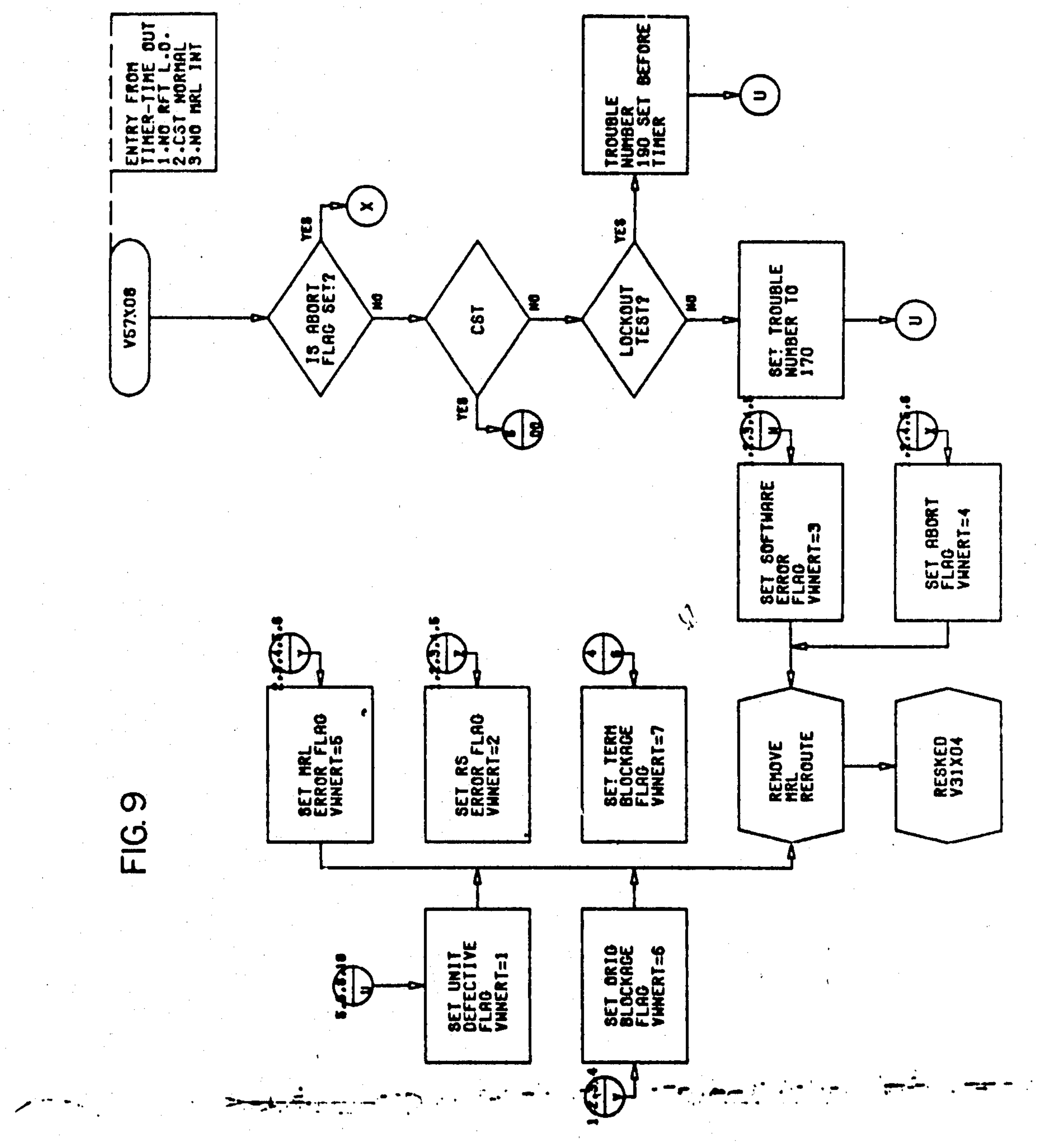
Figure 10:
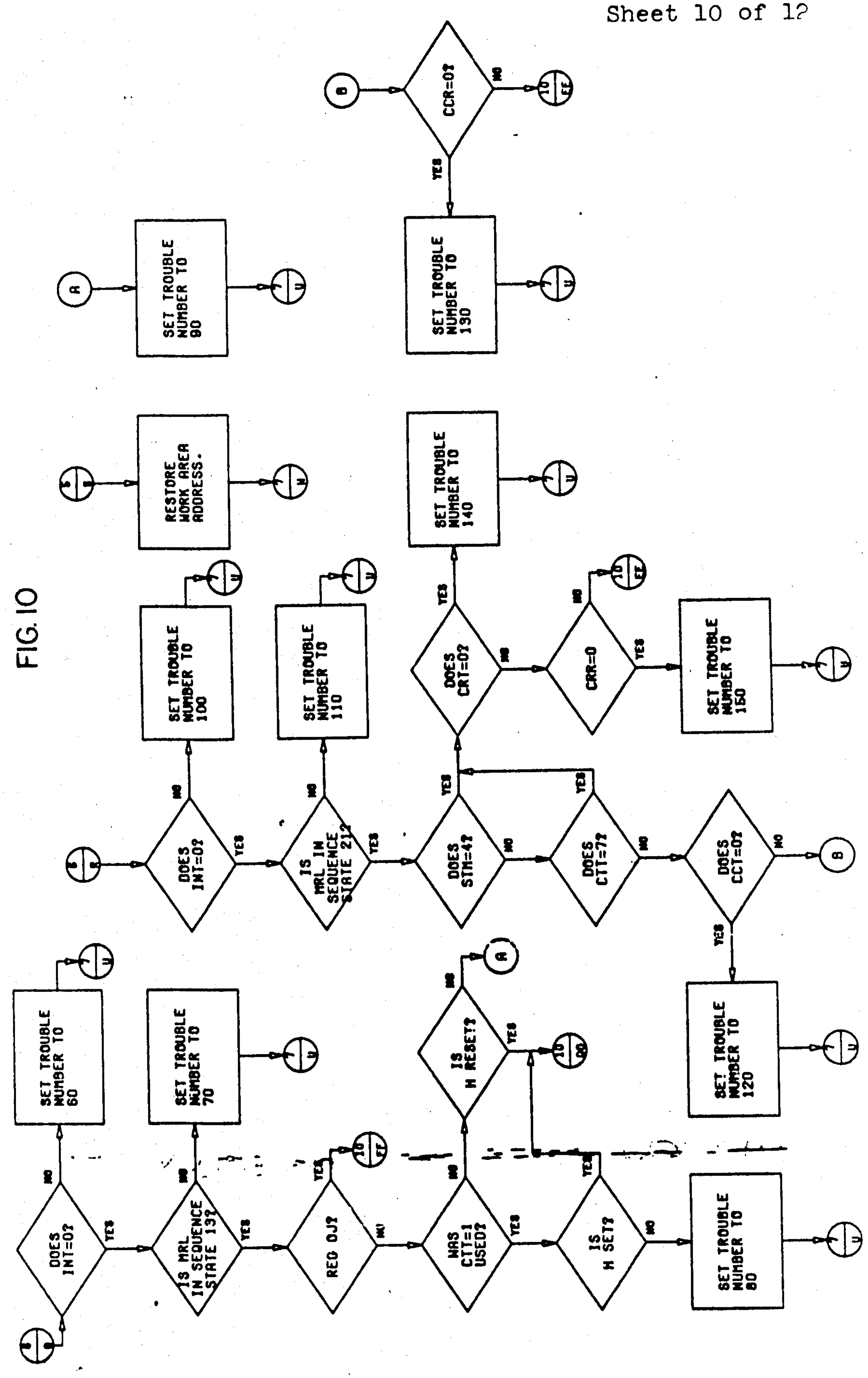
Figure 11:
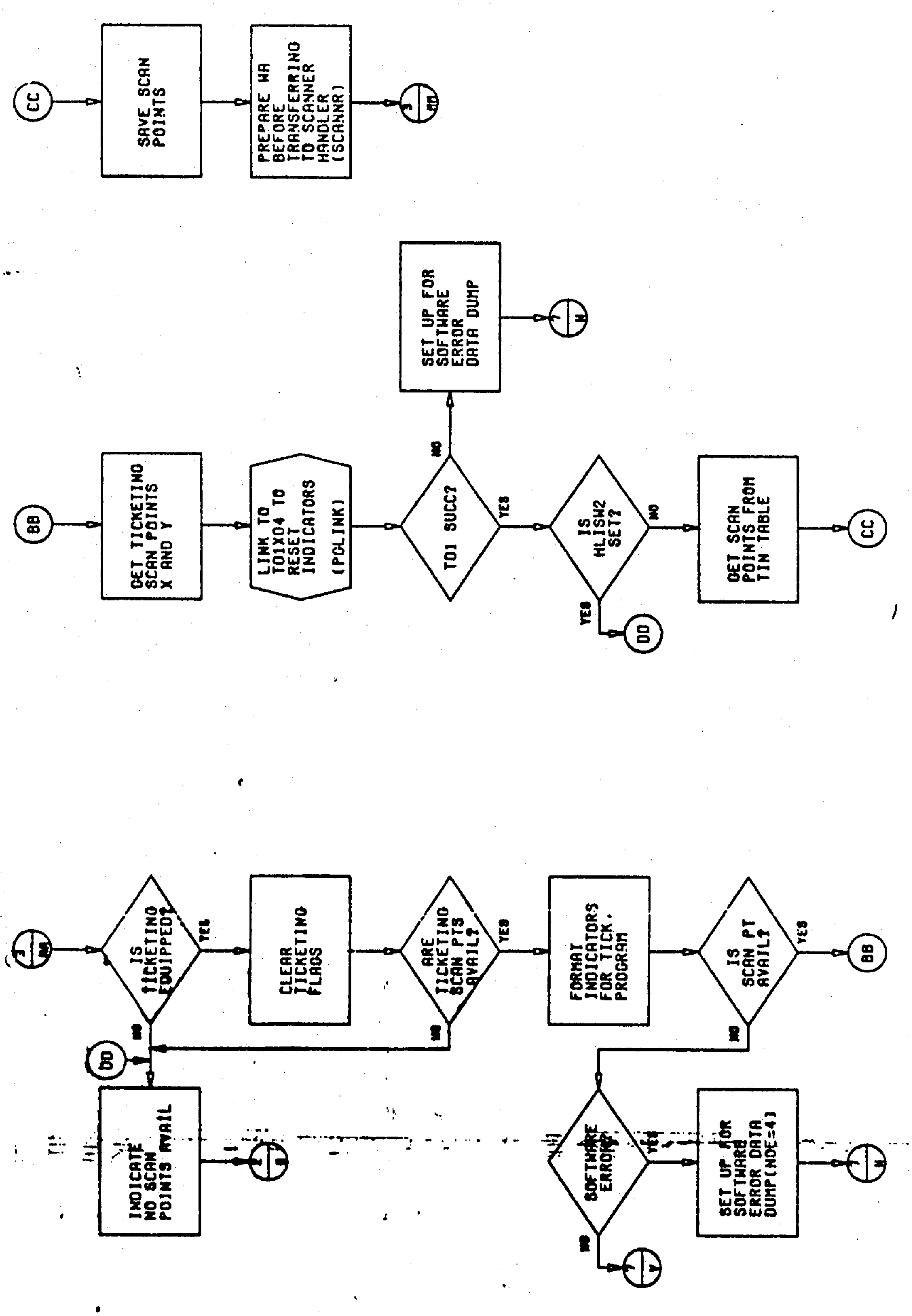
Figure 12:
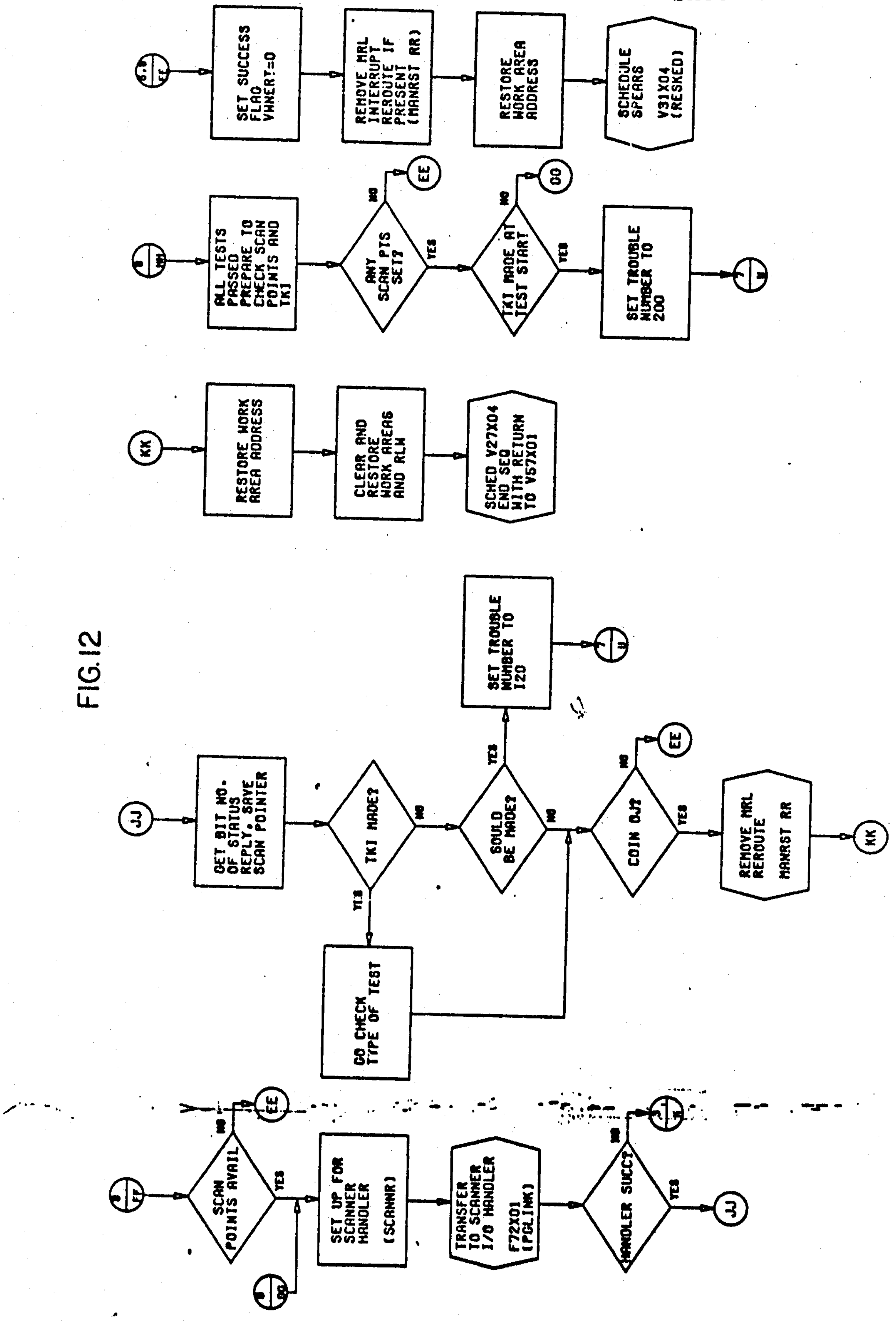

Considering now a detailed system operation, module V57 first performs a series of tests on the coin OJ in block 300 of FIG. 2 that are not pertinent to this disclosure, but some will be discussed to orient the testing sequence that is to follow. V57 schedules ORIGSU-V95X01 to pull an originating path to the desired coin OJ. The mark area was properly formatted for ORIGSU by the automatic test system control software module SPEARS prior to scheduling OJ TEST at V57X01. The return identity specified to ORIGSU is V57X02, which when entered determines if ORIGSU was successful. If successful, OJ TEST supplies the STO identity to be used in the test to MRLSEQ at V27X02 to perform an MRL start sequence. The main test made MTM and sub-test made STM information for the MRL were previously formatted by SPEARS. The MRLSEQ is scheduled and V57X03 is identified as the return to OJTEST after a successful start sequence. At this point, the work area is formatted to pull a path from the STI to the line picked by ORIGSU, which is accomplished by using TERMSU-V96X01 with the return identity specified as V57X04. When V57X04 is scheduled and after determining that TERMSU was successful, word A of the MRAI register in the MRL circuit is read to check the sequence state of the MRL. The MRL should be in sequence state four if the MRL interfaced properly with the terminating pull path through the selector matrix. If the MRL has advanced properly, the TERMSU portion of the work area is zeroed out. The TGN value of the STO is then retrieved from table HLI and is used to access the appropriate COX table to retrieve the switching digits of the STO, which are then stored in the work area for TERMSU. The selector matrix inlet identity of the coin OJ is then transferred from table RLW to the work area for TERMSU. An initial IN value of four is specified for the RJ with an IN = 10 to be written upon a successful path pull. Just prior to scheduling TERMSU, a read/-modify/write of the RJ slot is performed. The cut-through type specified by the SPEARS module in table RLW is written into the RJ slot and the freeze bit is reset. TERMSU is then scheduled with a return identity of V57X05 specified. The terminating marker has been instructed to set up a path from the selector matrix inlet associated with the coin OJ to the selector matrix outlet STO 46 circuit. The register sender unit 20 has also been instructed to cut the coin OJ through to the selector matrix inlet. The common logic unit 22 also places a ground potential on the C3 lead 212 to operate relay coil K6 in the coin OJ when cut through occurs. The coin OJ relay logic required to perform the cut through operation is not pertinent to this disclosure and has not been shown in FIG. 1. The MRL 51, having received its directions from the central porcessor, has enabled the interface unit 52 MGS gate 54 from lead 215 to switch a ground to operate relay coil K4 in the coin OJ. After V57X05 is scheduled by TERMSU and the terminating marker response indicates a successful network operation, the automatic test system MRAI register is read and checked for the proper sequence state, SSX × 7, for the MRL to have advanced to for enabling MRS gate 54. V57 then interrogates a flag to determine if the RJ RFT interrupt has occurred, in which case control is directly transferred to V57X06. If the RFT interrupt has not occurred, V57X06 is put on a timer queue for 50 milliseconds before checking for the RFT interrupt again. When V57X06 is scheduled from the timer queue and checking that the RTF interrupt has occurred, word 2A of the RJ slot is read using F08X02. The TRI field is examined for a successful cut through indication from the register sender. The register sender unit is instructed to perform a read/modify/write of the RJ slot to clear down the RJ. After a 700 millisecond time interval has elapsed, which allows for the RJ to clear down, V57X07 is entered and the MRAI is again read to check for the expected results, in block 301, all tests have passed the ticketing contact availability is checked in block 302. If a ticketing contact is indicated to exist, the ticketing scanner unit 30 is instructed in block 303 to get the ticketing scan points from the TIN table and transfer to the ticketing scanner handler module F72X01 to retrieve the status of slave relay contact K10-A and return the results through the scanner peripheral adapter 33 to the central processor for OJTEST to check in block 304. If the OJ type is a coin OJ without ticketing contacts or a regular OJ, then OJTEST in block 314 sets the appropriate pass or fail indication in block 311 removes the MRL interrupt reroute, and schedules the SPEARS control module, block 313, at V31X04.

If the OJ type is coin, checked in block 304, with ticketing contacts, the work area and table RLW are initialized to reflect a regular OJ type of test to be performed. This is accomplished by transferring the OJ identity and ticketing contact identity from the work area to a temporary storage location in block 306 and also transferring the selector matrix inlet SXI identity of the coin OJ from the routining RLW table to a temporary storage location in block 307. Both the work area and the routining table area initialized to zero in block 308 in preparation for testing the coin OJ as a regular OJ. The OJ identity and the SXI identity are then restored to their respective work area and RLW routining table locations in block 309. V27X04 is then scheduled to execute an MRL end sequence in block 310 with OJTEST V57X01 specified as the return point to now test the coin OJ as a regular OJ. When V57X01 is scheduled the originating path is again established via ORIGSU to the coin OJ as previously disclosed. When ORIGSU is successful and V57X03 is entered, the work area is formatted for TERMSU to pull a path from the coin OJ to the STO circuit. But before TERMSU is given control, the status of the ticketing scanner unit slave relay contact K10-A is read to insure that the relay contact is open before the terminating path is pulled. The TDB 31 interrupts the central processor and the SPA register data is read and passed to OJTEST for analysis. If the relay contact K10-A has indicated itself in an open condition, OJTEST then instructs the terminating marker to pull the selector matrix path to the STO 46 circuit. The coin OJ relay coil K6 is not operated or checked during this test. The MRL is now instructed to operate MGS gate 54 to switch a ground potential on ST lead 47. In this sequence relay coil K4 operates and closes the normally-opened contact K4-C, which provides a path for the ST lead ground potential to remain on relay coil K4 through normally-closed contact K6-B for the normally-closed contact K4-B now opens and removes this first path of ground potential to relay coil K4. The normally-opened contact K4-A also closes to energize relay coil K10, which closes its normally-opened contact K10-A. This sequence is verified by requesting the ticketing scanner unit to monitor this operation of the slave relay K10 and forward this status to the central processor to be passed to OJTEST. If this test is successful, checked in block 301, the OJ type is checked in block 302 and found to be a regular OJ type of test. This results in an all tests pass indication being set in block 312 and scheduling a return to the calling program, which is SPEARS at entry point V31X04.

As a part thereof, Appendix A contains the actual module listings, which contain all the processor instructions necessary to perform the appropriate software operations of the communication switching system.

APPENDIX A

```
                                     V57   HR MILLER  OJTEST-ATS OJ TEST MODULE                    V57
PAGE 001      1/09/74     TIME :  1142 PM

***    ENVIRONMENT  CMM1   RETRIEVED FROM  FLODES  FLDD FILE    CREATED BY 611DWMM1  LAST UPDATED ON  9/18/73
***    ENVIRONMENT  CMM2   RETRIEVED FROM  FLODES  FLDD FILE    CREATED BY 627LSMM2  LAST UPDATED ON  8/09/73
***    ENVIRONMENT  CPM1   RETRIEVED FROM  FLODES  FLDD FILE    CREATED BY 627LVPM1  LAST UPDATED ON  8/09/73
***    ENVIRONMENT  CPM2   RETRIEVED FROM  FLODES  FLDD FILE    CREATED BY 627LVCPM  LAST UPDATED ON  8/09/73
***    ENVIRONMENT  CPM5   RETRIEVED FROM  FLODES  FLDD FILE    CREATED BY 627LVPM5  LAST UPDATED ON  8/09/73
***    ENVIRONMENT  ECPR   RETRIEVED FROM  FLODES  FLDD FILE    CREATED BY 627LVCPR  LAST UPDATED ON  9/18/73
***    ENVIRONMENT  EASP   RETRIEVED FROM  FLODES  FLDD FILE    CREATED BY 623LVASP  LAST UPDATED ON  8/09/73
***    ENVIRONMENT  EFWA   RETRIEVED FROM  FLODES  FLDD FILE    CREATED BY 623LVFWA  LAST UPDATED ON  7/07/72
***    ENVIRONMENT  EFJN   RETRIEVED FROM  FLODES  FLDD FILE    CREATED BY 623LVFJN  LAST UPDATED ON 11/05/71
***    ENVIRONMENT  EVWA   RETRIEVED FROM  FLODES  FLDD FILE    CREATED BY 627LVVWA  LAST UPDATED ON  6/22/73
***    ENVIRONMENT  EHAU   RETRIEVED FROM  FLODES  FLDD FILE    CREATED BY 628LVHAU  LAST UPDATED ON  6/22/73
***    ENVIRONMENT  EMSR   RETRIEVED FROM  FLODES  FLDD FILE    CREATED BY 627LSMSR  LAST UPDATED ON 12/04/72
***    ENVIRONMENT  ECOO   RETRIEVED FROM  FLODES  FLDD FILE    CREATED BY 628DWCOO  LAST UPDATED ON  7/19/73
***    ENVIRONMENT  ECTA   RETRIEVED FROM  FLODES  FLDD FILE    CREATED BY 628DWCTA  LAST UPDATED ON  4/26/73
***    ENVIRONMENT  ECOA   RETRIEVED FROM  FLODES  FLDD FILE    CREATED BY 628DWCOA  LAST UPDATED ON  7/18/73
***    ENVIRONMENT  ECOB   RETRIEVED FROM  FLODES  FLDD FILE    CREATED BY 628DWCOB  LAST UPDATED ON  9/19/73
***    ENVIRONMENT  ECOI   RETRIEVED FROM  FLODES  FLDD FILE    CREATED BY 628DWCOI  LAST UPDATED ON  7/18/73
***    ENVIRONMENT  ECHT   RETRIEVED FROM  FLODES  FLDD FILE    CREATED BY 627LVCHT  LAST UPDATED ON 11/27/72
***    ENVIRONMENT  EHDT   RETRIEVED FROM  FLODES  FLDD FILE    CREATED BY 627LSHDT  LAST UPDATED ON  6/22/73
***    ENVIRONMENT  EHLI   RETRIEVED FROM  FLODES  FLDD FILE    CREATED BY 623GAHLI  LAST UPDATED ON  6/22/73
***    ENVIRONMENT  ECWA   RETRIEVED FROM  FLODES  FLDD FILE    CREATED BY 627LVCWA  LAST UPDATED ON  7/18/73
***    ENVIRONMENT  EHRL   RETRIEVED FROM  FLODES  FLDD FILE    CREATED BY 628LVHRL  LAST UPDATED ON 11/04/71
***    ENVIRONMENT  ECEP   RETRIEVED FROM  FLODES  FLDD FILE    CREATED BY 627LVCEP  LAST UPDATED ON 12/14/72
***    ENVIRONMENT  ECLO   RETRIEVED FROM  FLODES  FLDD FILE    CREATED BY 628MACLO  LAST UPDATED ON 11/04/71
***    ENVIRONMENT  ETWA   RETRIEVED FROM  FLODES  FLDD FILE    CREATED BY 628DWTWA  LAST UPDATED ON  7/19/73
***    ENVIRONMENT  ETAC   RETRIEVED FROM  FLODES  FLDD FILE    CREATED BY 628DWTAC  LAST UPDATED ON  6/22/73
***    ENVIRONMENT  ETIN   RETRIEVED FROM  FLODES  FLDD FILE    CREATED BY 628DWTIN  LAST UPDATED ON  6/22/73

                                  MULTIPLY DEFINED SYMBOLS

HA'I    00000764  00000764
```

```
                              V57   MR MILLER  OJTEST-ATS OJ TEST MODULE                            V57
  1/08/74    TIME :  1:42 PM

                 0002  *                                                                          00004
                 0003  * THE PARTIAL EXPRESSION '+T010-T010' IN THE TROUBLE-NO. CODE SERVES TO     00005
                 0004  * FORCE T010 INTO THE REFERNCED SYMBOL TABLE.                               00006
                 0005  *                                                                          00007
                 0006           BRING   CMM1                                                      00008
                 0007           BRING   CMM2                                                      00009
                 0008           BRING   CPM1                                                      00010
                 0009           BRING   CPM2                                                      00011
                 0010           BRING   CPM5                                                      00012
                 0011           BRING   ECPR                                                      00013
                 0012           BRING   EASP                                                      00014
                 0013           BRING   EFWA                                                      00015
                 0014           BRING   EFJN                                                      00016
                 0015           BRING   EVWA                                                      00017
                 0016           BRING   EMAU                                                      00018
                 0017           BRING   EIRR                                                      00019
                 0018           BRING   ECOD                                                      00020
                 0019           BRING   ESTA                                                      00021
                 0020           BRING   ECUA                                                      00022
                 0021           BRING   ECOD                                                      00023
                 0022           BRING   ECUL                                                      00024
                 0023           BRING   ECHT                                                      00025
                 0024           BRING   EHDT                                                      00026
                 0025           BRING   EHLI                                                      00027
                 0026           BRING   ECWA                                                      00028
                 0027           BRING   EHRL                                                      00029
                 0028           BRING   ECEP                                                      00030
                 0029           BRING   ECLD                                                      00031
                 0030           BRING   ETWA                                                      00032
                 0031           BRING   ETAC                                                      00033
                 0032           BRING   ETIN                                                      00034

                 0034           PROGCD  V57,V57X,V57X01,V57X02,V57X03,V57X04,V57X05,V57X06,V57X07  00036
   00000               V57X
   00020               V57X01
   00032               V57X02
   00147               V57X03
   00203               V57X04
   00516               V57X05
   00562               V57X06
   00767               V57X07
                 0035           ETC     V57X08                                                    00037
   01114               V57X08

                 0037           VECTOR  V57,V57X01,V57X02,V57X03,V57X04,V57X05,V57X06,V57X07       00039
                 0038           ETC     V95,V27,V32,V96,V01,F08,E01,E02,L00,V31                   00040
                 0039           ETC     V57X08,T01,F72,L09                                        00041

                 0041           LST                                                               00043

                 0043           START   V57X01                                                    00045

                 0045  *        ENTRY LINE TABLE FOR V57-OJTEST.                                  00047

                 0047           LNKTAB  V57X,V57X01,V57X02,V57X03,V57X04,V57X05,V57X06,V57X07,     00049
                 0048           ETC     V57X08                                                    00050
                 ++1   V57X     TORP
   00000  00000000  ++1         NDS     0
                 ++1            PROT
                 ++1            DSICHK  V57X01,V57X02,V57X03
   00001  0 11 00001  ++2       BUN     (V57X01)
                 ++1            TORP
   00002  00000000  ++1         NDS     0
                 ++1            PROT
                 ++1            DSICHK  V57X02,V57X03,V57X04
   00003  0 11 00003  ++2       BUN     (V57X02)
                 ++1            TORP
   00004  00000000  ++1         NDS     0
                 ++1            PROT
                 ++1            DSICHK  V57X03,V57X04,V57X05
   00005  0 11 00005  ++2       BUN     (V57X03)
                 ++1            TORP
   00006  00000000  ++1         NDS     0
                 ++1            PROT
                 ++1            DSICHK  V57X04,V57X05,V57X06
   00007  0 11 00007  ++2       BUN     (V57X04)
                 ++1            TORP
   00010  00000000  ++1         NDS     0
                 ++1            PROT
                 ++1            DSICHK  V57X05,V57X06,V57X07
   00011  0 11 00011  ++2       BUN     (V57X05)
                 ++1            TORP
   00012  00000000  ++1         NDS     0
                 ++1            PROT
                 ++1            DSICHK  V57X06,V57X07,V57X08
   00013  0 11 00013  ++2       BUN     (V57X06)
                 ++1            TORP
   00014  00000000  ++1         NDS     0
                 ++1            PROT
                 ++1            DSICHK  V57X07,V57X08,-
   00015  0 11 00015  ++2       BUN     (V57X07)
                 ++1            TORP
   00016  00000000  ++1         NDS     0
                 ++1            PROT
                 ++1            DSICHK  V57X08,-
   00017  0 11 00017  ++2       BUN     (V57X08)

                 0051  *        V57X01 IS SCHEDULED BY SPEAKS TO INITIATE THE OJ TEST.            00053

   00020  0 62 00756  0053  V57X01  BSP     AB01            TO CHECK FOR ABORT REQUIRED       00055
   00021  0 34 00021  0054  A010    LDA     =2*FWAELN.P*PV57A*FWAPRI.P                        00056
   00022  0 01 00022  0055          ADL     (V57)           HAVE ORIGSU SCHEDULE V57X02 UPON  00057
   00023  1 55 00023  0056          STA     VWBCPQ,1        COMPLETION OF TASK.               00058

                 0058  *                          SCHEDULE ORIGSU TO PULL A PATH            00060
                 0059  *                           FROM AN IDLE INLET TO AN IDLE            00061
                 0060  *                           RJ USING A SPECIFIED OJ.                 00062
                 0061           RESKED  V95,V95X01,PV57A                                        00063
                 ++1            SETNEP  V95,V95X01,PV57A,FWANPG
                 ++2            SETALL  V95,V95X01,PV57A,FWANPG
```

```
                     V57   HR MILLER  UJTEST-ATS OJ TEST MODULE                V57
        1/08/74    TIME :  1:42 PM

00024  0 54 00024   **3    M2      LDA     =1*FWAELN.P*PV57A*FWAPRI.P
00025  0 01 00025   **3    M9      ADI     (V95)
00026  1 55 00026   **3            STA     FWANPG,1
00027  0 64 00027   **1            LDA     =PV57A
                    **1    M2      PGLINK  E01,E01X06
00030  3 22 00012   **2            CAX     10,3
00031  4 62 00031   **2    M       BSP     *(E01)

00032  1 54 00032   0063   V57X02  LDA     VWBFAL,1             WAS ORIGSU SUCCESSFUL ?
00033  0 14 00037   0064           BNA     B002                 NO,GO HANDLE
00034  0 26 00036   0065           STX     RLWRJS,0             YES, SET RJ STATUS
00035  0 62 00756   0066           BSP     A001                 GO CHECK FOR ABORT REQUIRED
00036  0 11 00074   0067           BUN     B010                 NO, GO SET RR ON THE RJ
00037  0 50 00037   0068   B002    ANA     =VWBILT.N**VWBREJ.N     SOFTWARE ERROR ?
00040  0 13 01251   0069           BZA     G180                 NO,BLOCKAGE
00041  0 11 00070   0070           BUN     A410                 YES,GO HANDLE
                    0071   *
                    0072   *       THIS CODE PREVENTS ERRONEOUS BILLING ON THE OJ WHICH
                    0073   *        WE ARE TESTING BY HAVING TICKETING RESET THE NECESSARY
                    0074   *        INDICATORS.
                    0075   *                                    LJP 073172

                    0077   H005    FLDTST  L,CEPETK,0,0         IS TICKETING EQUIPPED?
00042  0 54 00042   **1            LDA     CEPETK,0
00043  0 045 0100   **1            SRNZ    CEPETK,N
00044  0 11 00277   0078           BUN     H030                 NO,CONT.
00045  0 11 00214   0079           BUN     D020                 YES,GO CHECK FOR SCAN POINTS AVAIL.

                    0081   *       TICKETING EQUIPPED,FORMAT INDICATORS FOR TICKETING
                    0082   *        PROGRAM
00046  1 54 00046   0083   B007    LDA     FWA+62,1             GET CLO PRIMARY CELL
00047  0 50 00047   0084           ANA     CXHTSH.M             GET TICKETING SCAN BIT
00050  1 55 00050   0085           STA     CXHTSD,1
00051  1 54 00051   0086           LDA     FWA+63,1             GET CLO SECONDARY CELL
00052  0 044 0004   0087           SLNZ    04                   IS SCAN POINT AVAILABLE?
00053  0 11 00037   0088           BUN     B002                 NO,DON'T EXECUTE INTERFACE CODE
00054  0 50 00054   0089           ANA     CXHTSG.M             GET TICKETING SCAN CKTS. PART KEY
00055  1 55 00055   0090           STA     CXHTSG,1
                    0091   *
                    0092   *       LINK TO T01 TO RESET INDICATORS
                    0093   *
                    0094           PGLINK  T01,T01X04
00056  3 22 00006   **1            CAX     6,3
00057  4 62 00057   **1    M       BSP     *(T01)

                    0096   *                                    UPON RETURN RA CONTAINS SUCCESS
                    0097   *                                    INDICATOR
                    0098   *                                    RA=NEG=SOFTWARE ERROR;RA=POS=SUCCESS
00060  0 15 00223   0099           BPA     D017
00061  0 64 00061   0100   B0C6    LDQ     ='T01'
00062  1 65 00062   0101           STQ     VWNPDT,1                SECONDARY PROGRAM
00063  1 64 00055   0102           LDQ     CXHTSG,1
00064  1 65 00064   0103   A400    STQ     VWNKEY,1                SEARCH KEY
00065  1 55 00065   0104           STA     VWNPLY,L                RESULT
00066  0 64 00066   0105           LDQ     ='V57'
00067  1 65 00067   0106           STQ     VWNPRO,1                PRIMARY PROGRAM
00070  3 22 00003   0107   A410    CAX     3,3                     ERROR TYPE

00071  0 64 00071   0108           LDQ     =4*VWNNOE.P*0*VWNSPI.P       NO. OF DATA WORDS
00072  1 55 00072   0109           STQ     VWNSPI,1                                 LJP 9/19/73
00073  0 11 01257   0110           BUN     G190
00074  0 54 00064   0111   D010    LDA     =6*FWAELN.P*PV57A*FWAPRI.P
                    0112   *                                 WITH THE RJ.
00075  0 01 00022   0113           ADI     (V57)
                    0114           PGLINK  V32,V32X01
00076  3 22 00000   **1            CAX     0,3
00077  4 62 00077   **1    M       BSP     *(V32)
00100  2 30 00106   0115           BPX     H011,2
00101  0 64 00101   0116   A013    LDQ     ='V32'            UNABLE TO REROUTE EXHIBIT
00102  1 65 00062   0117           STQ     VWNPDT,1              SECONDARY PROGRAM
00103  1 64 00103   0118           LDQ     FWARJN,1              SEARCH KEY
00104   03610100    0119           CCR     RA,                   RESULT
00105  0 11 00064   0120           BUN     A400

00106  0 54 00106   0122   D011    LDA     RLWXMS            PUT STO AND STI IDENTITIES IN
00107  0 50 00107   0123           ANA     RLWXMS.M           BUFFER FOR MRLSEQ.
00110  0 123 0022   0124           LRA     RLWXMS.L
00111   03600110    0125           CRR     RA,X2
00112  0 122 0006   0126           LLA     RLWSTO.L
00113   03601101    0127           CRR     RA**X2,RA
00114  0 55 00114   0128           STA     RLWSTO
                    0129           FLDTST  L,VWBSEC,1,1
00115  1 54 00015   **1            LDA     VWBSEC,1
00116  0 50 00077   **1    M6      ANA     VWBSEC.M
00117  0 043 0001   **1            SRNE    1*VWBSEC.P
00120  0 11 00130   0130           BUN     D020              OFFICE SECTION 1.
                    0131           FLDSET  L,RLWSTB,,1       OFICE SECTION 2.
00121  0 54 00115   **1            LDA     RLWSTB,-
00122  0 51 00122   **1            ORA     RLWSTB.M
00123  0 55 00121   **1            STA     RLWSTB,-
                    0132           FLDSET  L,RLWSOB,,1
00124  0 54 00123   **1            LDA     RLWSOB,-
00125  0 51 00125   **1            ORA     RLWSOB.M
00126  0 55 00124   **1            STA     RLWSOB,-
00127  0 11 00136   0133           BUN     D030
                    0134   D020    FLDSET  L,RLWSTA,,1
00130  0 54 00126   **1            LDA     RLWSTA,-
00131  0 51 00131   **1            ORA     RLWSTA.M
00132  0 55 00130   **1            STA     RLWSTA,-
                    0135           FLDSET  L,RLWSOA,,1
00133  0 54 00132   **1            LDA     RLWSOA,-
00134  0 51 00134   **1            ORA     RLWSOA.M
```

```
                          V57   HR MILLER  OJTEST-ATS OJ TEST MODULE                                 V57
         1/08/74     TIME :  1:42 PM

00135 0 55 00133   **1               STA      RLWSDA,-
00136 0 54 *0136   0136   B030       LDA      =3*FWAELN.P+PV57A*FWAPRI.P                                00138
00137 0 01 00075   0137              ADI      (V57)              HAVE MRLSEQ SCHEDULE V57X03 UPON       00139
00140 1 55 00065   0138              STA      VWNPLY,1            SUCCESSFUL COMPLETION OF TASK.        00140

                   0140              RESKED   V27,V27X02,PV57A                                          00142
                   **1               SETNEP   V27,V27X02,PV57A,FWANPG
                     **2                SETALL   V27,V27X02,PV57A,FWANPG
00141  0 54 00021    **3   M3           LDA      =2*FWAELN.P+PV57A*FWAPRI.P
00142  0 01 00142    **3   M9           ADI      (V27)
00143  1 55 00026    **3                STA      FWANPG,1
00144  0 54 00027    **1                LDA      =PV57A
                     **1   M2           PGLINK   E01,E01X06
00145  3 22 00012    **2                CAX      10,3
00146  4 62 00031    **2   M            BSP      *(E01)

                   0142  *       V57X03 IS SCHEDULED BY THE MRLSEQ AFTER EXECUTING                       00144
                   0143  *        A SUCCESSFUL START SEQUENCE.                                           00145

 00147  0 62 00756   0145  V57X03  BSP      AB01               GO CHECK FOR ABORT REQUIRED               00147
                     0146  C010    FLDSET   L,VWFINH,1,1       FORMAT VWF FOR TERMSU TO PULL A           00148
 00150  1 54 00150   **1           LDA      VWFINH,1
 00151  0 51 00151   **1           ORA      VWFINH,M
 00152  1 55 00150   **1           STA      VWFINH,1
 00153  1 54 00115   0147          LDA      VWBSEC,1           PATH FROM THE STI TO THE LINE             00149
 00154  0 50 00116   0148          ANA      VWBSEC,M           PICKED BY ORIGSU.                         00150
 00155  1 55 00155   0149          STA      VWFSE1,1                                                     00151
                     0150          CLPR     RLWXMS,,VWFS1X,1                                             00152
 00156  0 54 00106   **1   A       LDA      RLWXMS,-
 00157  0 50 00107   **1   F       ANA      RLWXMS,M
      00104400       0151  STILOC  EQU      VWFSI8.P+VWFSIU.P+VWFSI1.P    STI GRADED SA8+SAU+SA1=1.     00153
 00160  0 40 00160   0152          ADD      =STILOC                                                      00154
 00161  1 55 00161   0153          STA      VWFS1X,1                                                     00155
                     0154          CLPR     VWBSEC,1,VWFSE3,1                                            00156
 00162  1 54 00153   **1   A       LDA      VWBSEC,1
 00163  0 50 00154   **1   F       ANA      VWBSEC,M
 00164  0 40 00164   0155          ADD      =5*VWFIN3.P                                                  00157
 00165  1 55 00165   0156          STA      VWFIN3,1                                                     00158
 00166  1 54 00166   0157          LDA      VWBMTX,1                                                     00159
 00167  0 50 00167   0158          ANA      VWBRUO.O                                                     00160
 00170  0 50 00170   0159          ANA      VWRBUO.O                                                     00161
 00171  1 55 00171   0160          STA      VWFL3X,1                                                     00162
 00172  0 54 00172   0161          LDA      =4*FWAELN.P+PV57A*FWAPRI.P                                   00163
 00173  0 01 00137   0162          ADI      (V57)              HAVE TERMSU SCHEDULE V57X04 UPON          00164
 00174  1 55 00023   0163          STA      VWFCPG,1                                                     00165
                     0164          RESKED   V96,V96X02,PV57A                                             00166
                     **1           SETNEP   V96,V96X02,PV57A,FWANPG
                     **2           SETALL   V96,V96X02,PV57A,FWANPG
 00175  0 54 00141   **3   M3      LDA      =2*FWAELN.P+PV57A*FWAPRI.P
 00176  0 01 00176   **3   M9      ADI      (V96)
 00177  1 55 00143   **3           STA      FWANPG,1
 00200  0 54 00144   **1           LDA      =PV57A
                     **1   M2      PGLINK   E01,E01X06
 00201  3 22 00012   **2           CAX      10,3
 00202  4 62 00146   **2   M       BSP      *(E01)
                     0166  *      V57X04 IS SCHEDULE BY TERMSU AFTER ATTEMPTING TO                       00168
                     0167  *       PULL A PATH FROM AN STI TO A LINE.                                    00169

 00203  1 26 00203   0169  V57X04  STX      FJN001,1           SAVE WA ADDRESS.                          00171
 00204  0 62 00756   0170          BSP      AB01               GO CHECK FOR ABURT REQURIED               00172

                     0172  D010    FLDTST   L,VWFTRB,1,0       WAS TERSU SUCCESSFUL?                     00174
 00205  1 54 00152   **1           LDA      VWFTRB,1
 00206  0 044 4000   **1   M4      SLNZ     VWFTRB.P/010000
 00207  0 11 00324   0173          BUN      D022               YES, GO READ MRA                          00175
                     0174          FLDTST   L,VWFTRT,1,1                                                 00176
 00210  1 54 00705   **1           LDA      VWFTRT,1
 00211  0 040 2000   **1   M5      SLNT     VWFTRT.P/010000
 00212  0 11 00070   0175          BUN      A410               SOFTWARE ERROR.                           00177
 00213  0 11 01256   0176          BUN      G1R3               TERM PATH BLOCKAGE                        00178

 00214  0 26 00214   0178  D020    STX      RLWJK3,0           CLEAR TK1 CORRECT STATE FLAG              00180
 00215  0 26 00215   0179          STX      RLWW13,0           CLEAR SCAN POINT INDICATOR                00181
 00216  0 26 00216   0180          STX      RLWJK4,0           CLEAR TK1 STATUS FLAG                     00182
                     0181  * INTERFACE FOR SCANNER HANDLER                                               00183
 00217  0 54 00151   0182          LDA      CLOTSA,M           ARE TICKETING SCAN POINTS AVAIL.          00184
 00220  1 71 00051   0183          SMNZ     FWA+63,1                                                     00185
 00221  0 11 00277   0184          BUN      H030               NO, GO INITIALIZE WA.                     00186
 00222  0 11 00046   0185          BUN      B007               YES, GO CALL IOL                          00187
 00223  0 54 00223   0186  D019    LDA      HLISW2             SHOULD TICKETING TO CHECKED               00188
 00224  0 122 0001   0187          LLA      1                                                            00189
 00225  0 14 00277   0188          BNA      H030               NO GO CLEAR WA                            00190
 00226  1 54 00220   0189          LDA      FWA+63,1           YES,GET SKAN PTS. FROM 'TIN'              00191
 00227  0 031 0000   0190          ANR      0                  TABLE.SAVE CLOTSX,TSY     LJP 9/19/73     00192
 00230  0 55 00230   0191          STA      RLWJK5             TSA FOR LATER USE.        LJP 9/19/73     00193
 00231  0 50 00231   0192          ANA      CLOTSX,M                                                     00194
 00232  0 123 0023   0193          LRA      CLOTSX,L                                                     00195
 00233   03600120    0194          CRR      RA,X3                                                        00196
 00234  3 54 00234   0195          LDA      TINGSA,3           GSA                                       00197
 00235  0 50 00235   0196          ANA      TINGSA,M                                                     00198
 00236  0 123 0001   0197          LRA      1                                                            00199
 00237   03600102    0198          CRR      RA,RO                                                        00200
 00240  1 54 00226   0199          LDA      FWA+63,1           BDA                                       00201
 00241  0 50 00241   0200          ANA      CLOTSY,M                                                     00202
 00242  0 123 0013   0201          LRA      CLOTSY,L-4                                                   00203
 00243   03600301    0202          CRR      RO++RA,RA                                                    00204
 00244  0 032 4000   0203          ORL      04000                                                        00205
 00245  1 55 00245   0204          STA      TWAGSA,1                                                     00206
 00246  0 55 00215   0205          STA      RLWW13             SAVE SCAN POINTS                          00207
                     0206          SCANNR   NORMAL                                                       00208
                     **1   DIR     EQU      O*FWADIR.P
 00247  0 54 00247   **1           LDA      =DIR+7*FWADNO.P
 00250  1 55 00250   **1   C1      STA      FWADIR,1
                     0207          PGLINK   F72,F72X01                                                   00209
 00251  3 22 00000   **1           CAX      0,3
 00252  4 62 00252   **1   M       BSP      *(F72)
                     0208  * RETURN FROM SCANNER HANDLER                                                 00210
```

```
                         V57   HR MILLER  UJTEST-ATS OJ TEST MODULE                          V57
          1/08/74    TIME :  1142 PM

00253  2 30 00304   0209             BPX    D023,2            TROUBLE, GO CHECK TYPE
00254  1 54 00046   0210             LDA    FWA+62,1          GET BIT INDICATOR
00255  0 50 00047   0211             ANA    CLOTSB,M
00256  0 123 0021   0212             LRA    CLOTSB,L
00257  0 46 00230   0213             ADM    RLWJK5            SAVE CLOTSB FOR LATER USE     LJP 9/19/73
00260   03600120    0214             CRR    RA,X3             CHECK TK 1 STATUS
00261  0 54 00261   0215             LDA    =1
00262  3 122 0000   0216             LLA    ,3
00263  1 70 00263   0217             SMMI   THAACT,1
00264  0 44 00216   0218             ADM    RLWJK4            SET TK1 MADE FLAG.
00265  0 54 00265   0219             LDA    RLWSTM
00266  0 50 00266   0220             ANA    RLWSTM,M
00267  0 41 00267   0221             SUB    =2*RLWSTM,P
00270  0 13 00272   0222             BZA    H010              YES,GO CHECK CTT
00271  0 11 00301   0223             BUN    H020              NO, GO INDICATE 'SHOULD NOT BE MADE'.
00272  0 54 00272   0224   H010      LDA    RLWCTT            YES, IS CTT=4
00273  0 50 00200   0225             ANA    RLWCTT,M
00274  0 41 00071   0226             SUB    =4*RLWCTT,P
00275  0 13 00301   0227             BZA    H020              YES, GO SET SHOULD NOT BE MADE FLAG.
00276  0 11 00303   0228             BUN    D021

00277  0 26 00246   0230   H030      STX    RLWW13,0          INDICATES NO SCAN POINTS AVAIL.
00300  0 11 00303   0231             BUN    D021

00301  0 54 00301   0233   H020      LDA    =040000000        SET 'SHOULD NOT BE MADE' INDICATOR
00302  0 55 00214   0234             STA    RLWJK3
00303  0 11 00413   0235   D021      BUN    D030              GO INITIALIZE WA FOR TERMSU

00304  0 54 00066   0237   D023      LDA    ='V57'
00305  1 55 00067   0238             STA    VWNPRO,1          SET UP DATA FOR EOT UNSUCCESSFUL
00306  0 54 00306   0239             LDA    ='I72'
00307  1 55 00102   0240             STA    VWNPUT,1
00310  0 54 00277   0241             LDA    RLWW13
00311  1 55 00064   0242             STA    VWNKEY,1
00312   03601001    0243             CRR    X2,RA
00313  1 55 00140   0244             STA    VWNPLY,1
00314  0 54 00274   0245             LDA    =4*VWNNOE,P
00315  1 55 00072   0246             STA    ,WNNOE,1
00316  1 54 00103   0247             LDA    FWAEIO,1
00317  0 50 00317   0248             ANA    FWAEIO,M
00320  0 41 00320   0249             SUB    =3*FWAEIO,P       BUSY OR SOFT WARE ERROR
00321  0 13 00070   0250             BZA    A610              SOFTWARE ERROR
00322  3 22 00006   0251             CAX    6,3               NO, BUSY, GO SET FLAG
00323  0 11 01257   0252             BUN    G190

00324  2 22 00324   0254   D022      CAX    RLWAIA,2
                    0255             MCCIOH MRA,3,H,I
                    **1              MCCI01 MRA,3,H,I,E1
                    **2    E1        EQU    10
                    **2    PA        EQU    2
00325  1 22 00022   **2    B50       CAX    E1+3+5,1
00326  0 64 00326   **2    F01       LDQ    =PA
                    **1              MCCI03 MRA,3,H,I,E1
                    **2    TEST      EQU    E1+3
00327   03600001    **2    G01       CRR    ,RA
                    **1              MCCI02 MRA,3,H,I
                    **2    ENT1      EQU    0
                    **2    ENT2      EQU    2
                    **2              PGLINK V01,V01X05
00330  3 22 00010   **3              CAX    8,3
00331  4 62 00331   **3    M         BSP    *(V01)
00332  2 22 00324   0256             CAX    RLWAIA,2          READ THE MRA
00333  5 22 00201   0257             CAX    *FJN001,1         RESTORE WAA.
00334  0 14 01247   0258             BNA    G170              IF (RA)<0, MCCIOH UN-SUCCESSFUL.

                    0260             FLDTST 4,RLWSSX,,6       DOES SSX = 4?
00335  0 54 00332   **1              LDA    RLWSSX,=
00336  0 50 00336   **1    M6        ANA    RLWSSX,M
00337  0 043 0004   **1              SRNE   4*RLWSSX,P
00340  0 11 00342   0261             BUN    D032              YES, GO CHECK STM FOR 1
00341  0 11 01247   0262             BUN    G170              NO.

00342  0 54 00265   0264   D032      LDA    RLWSTM
00343  0 50 00266   0265             ANA    RLWSTM,M
00344  0 41 00131   0266             SUB    =1*RLWSTM,P       STM = 1
00345  0 13 00347   0267             BZA    D031              YES CONT.
00346  0 11 00042   0268             BUN    B005              GO CHECK TICKETING STATUS

                    0271   * WRITE CTT =2 AND IN =7 FOR RE-ORDED
00347  0 54 00347   0272   D031      LDA    RJFXIN,0          SET 'IN' MASK
00350  0 55 00350   0273             STA    FJN002
00351  0 54 00273   0274             LDA    =7*RJFXIN,P       IN TO 7
00352  0 55 00352   0275             STA    FJN010
00353  0 54 00353   0276             LDA    RJFCTT,0          SET CTT MASK
00354  0 55 00354   0277             STA    FJN008
00355  0 54 00217   0278             LDA    =2*RJFCTT,P       SET CTT =2
00356  0 55 00356   0279             STA    FJN024
00357  1 54 00316   0280             LDA    FWARJI,1          SET RJ ID
00360   03600104    0281             CRR    RA,X1
00361  2 22 00350   0282             CAX    FJN002,2          SET BUFFER ADDRESS
00362   03600002    0283             CRR    ,RO
00363  0 54 00363   0284             LDA    =077577760
00364  0 55 00364   0285             STA    FJN003
00365  0 54 00365   0286             LDA    =12
00366  0 55 00366   0287             STA    FJN019
00367  0 54 00367   0288             LDA    =060400042
                    0289             PGLINK F08,F08X02
00370  3 22 00002   **1              CAX    2,3
00371  4 62 00371   **1    M         BSP    *(F08)
00372  5 22 00372   0290             CAX    *RLWWAS,1         RESTORE WORK AREA ADDRESS
00373  0 14 01243   0291             BNA    G140              TROUBLE WITH RS,GO SET FLAG
```

```
                    V57   HR MILLER  OJTEST-ATS OJ TEST MODULE                              V57
      1/08/74    TIME :  1:42 PM

                        0293  * SET TIMER TO 50 M SEC.                                             00295
                        0294  ******************************************************************* 00296
                        0'95  *                                                                 * 00297
                        0296  * T190__TROUBLE NUMBER 193 FOR V57 NO RFT FOR REORDER                 00298
                        0297  *                                                                 * 00299
                        0298  *                                                                 * 00300
                        0299  ******************************************************************* 00301
00374  0 54 00374       0300  T190   LDA      ='T190'*VWNTKN.P+T190-T190 SET TROUBLE NUMBER        00302
00375  1 55 00256       0301         STA      VWNTKN,1                                             00303
00376  0 54 00376       0302         LDA      =1*VWNSPI.P        SET DATA DUMP TO RS               00304
00377  1 55 00315       0303         STA      VWNSPI,1                                             00305
                        0304         TIMERB   =4,S,V57,V57X08,PV57A                                00306
                        ++1          GTIMER   =4,S,V57,V57X08,PV57A
00400  0 54 00314       ++2          LDA      =4
00401  1 55 00263       ++2          STA      FWAINT,L
                        ++2          SETNEP   V57,V57X08,PV57A,FWANPG
                        ++3          SETALL   V57,V57X08,PV57A,FWANPG
00402  0 54 00402       ++4    M31   LDA      =PV57A*FWAPRI.P
00403  0 01 00173       ++4    M9    ADI      (V57)
00404  1 55 00177       ++4          STA      FWANPG,1
                        ++2          FLDSET   L,FWATLR,1,2
00405  1 54 00405       ++3          LDA      FWATLR,1
00406  0 50 00406       ++3    M6    ANA      FWATLR.O
00407  0 032 0020       ++3    M9    ONL      2*FWATLR.P/010000
00410  1 55 00405       ++3          STA      FWATLR,1
                        ++1          PGLINK   E02,E02X03
00411  3 11 00004       ++2          CAX      4,3
00412  4 62 00412       ++2    M     BSP      *(E02)

00413  2 23 00040       0307  D030   CSX      32,2                  INITIALIZE VWF TO ZERO         00309
00414    03610100       0308         CCR      RA,                                                  00310
00415  1 55 00174       0309  D035   STA      VWFCPG,1                                             00311
00416  1 20 00001       0310         ADX      1,1                                                  00312
00417  2 25 00415       0311         ION      D035,2                                               00313
00420  5 22 00333       0312         CAX      *FJN001,1             RESTORE WAA.                   00314
00421  1 54 00162       0313  D040   LDA      VWBSEC,1                                             00315
00422  0 50 00163       0314         ANA      VWBSEC.M                                             00316
00423    03600110       0315         CRR      RA,X2                                                00317
00424  0 54 00221       0316         LDA      HLITGN                RETRIEVE IGN OF SPECIFIED STO. 00318
00425  0 50 00425       0317         ANA      HLITGN.M                                             00319
00426  0 123 0000       0318         LRA      HLITGN.L                                             00320
00427  0 55 00161       0319         STA      FJN002                                               00321
00430    03600120       0320         CRR      RA,X3                                                00322
00431  2 21 00001       0321         SBX      1,2                                                  00323
00432  2 32 00435       0322         BZX      D050,2                IF (XR2)=0, OFFICE SEC = 1.    00324
00433  3 54 00433       0323         LDA      CON,3                                                00325
00434  0 11 00436       0324         RUN      D060                                                 00326
00435  3 54 00435       0325  D050   LDA      CDA,3                                                00327
00436  0 50 00436       0326  D060   ANA      =07777400             PUT SWITCHING DIGITS FOR STO IN 00328
00437  1 55 00437       0327         STA      VWFHO3,1               VWF FOR TERMSU.               00329
                        0328         CLPR     RLWXMS,,VWFS3X.L                                     00330
00440  0 54 00156       ++1    A     LDA      RLWXMS,=
00441  0 50 00157       ++1    F     ANA      RLWXPS.M
00442  1 51 00442       0329         STA      VWFS3X,1              PUT SMX IDENTITY IN VWF FOR TERMSU. 00331

00443  0 54 00443       0331         LDA      =10*VWFRIS.P          SET FINAL IN VALUE=10 FOR TERMSU TO 00333
00444  1 55 00032       0332         STA      VWFRIS,1               WRITE IN RJ SLOT AFTER PULLING PATH. 00334

00445  0 54 00440       0334         LDA      RLWXMS                PLACE SXI OF OJ IN VWF.        00336
00446  1 55 00161       0335         STA      VWFSIX,1                                             00337
00447  1 54 00421       0336         LDA      VWBSEC,1                                             00338
00450  0 50 00422       0337         ANA      VWBSEC.M                                             00339
00451  1 55 00155       0338         STA      VWFSE1,1                 SAVE SECTION OF OJ IN VWF.  00340
00452  0 40 00452       0339         ADD      =4*VWFRI3.P+2*VWFIN3.P                               00341
00453  1 55 00165       0340         STA      VWFSE3,1                                             00342
00454  0 54 00454       0341         LDA      =5*FWAELN.P+PV57A*FWAPRI.P                           00343
00455  0 01 00403       0342         ADI      (V57)                 HAVE TERMSU SCHEDULE V57X05 UPON 00344
00456  1 55 00415       0343         STA      VWFCPG,1               COMPLETION OF TASK.           00345

00457  0 54 00457       0345         LDA      RJFXFD.O              READ/MODIFY/WRITE R-S MEMORY TO 00347
00460  0 55 00427       0346         STA      FJN002                 RESET FREEZE BIT, SET FO AND  00348
00461  0 52 00461       0347         ERA      =-1                    LOAD CTT SPECIFIED BY SPEARS  00349
00462  0 55 00352       0348         STA      FJN018                                               00350
00463  0 54 00463       0349         LDA      RJFXFB.O                                             00351
00464  0 55 00364       0350         STA      FJN003                                               00352
00465  0 54 00465       0351         LDA      RJFCTL.O              SET CTL. SO THE OP RELAY WILL OPERATE 00353
00466  0 55 00466       0352         STA      FJN006                 WHEN IN=4 IS WRITTEN.         00354
00467  0 52 00461       0353         ERA      =-1                                                  00355
00470  0 55 00470       0354         STA      FJN022                                               00356
00471  0 54 00353       0355         LDA      RJFCTT.O                                             00357
00472  0 55 00354       0356         STA      FJN008                                               00358
00473  0 26 00366       0357         SIX      FJN019,0                                             00359
                        0358         CLPR     RLWCTT,,RJFCTT.L                                     00360
00474  0 54 00272       ++1    A     LDA      RLWCTT,=
00475  0 50 00351       ++1    F     ANA      RLWCTT.M
00476  0 122 0015       ++1    E     LLA      RJFCTT.L-RLWCTT.L
00477  0 55 00356       0359         STA      FJN024                                               00361
00500  1 54 00357       0360         LDA      FWARJI,1                                             00362
00501    03610104       0361         CCR      RA,X1                                                00363
00502  0 51 00502       0362         ORA      =062400042                                           00364
00503  2 22 00460       0363         CAX      FJN002,2                                             00365
                        0364         PGLINK   F08,F08X02                                           00366
00504  3 22 00002       ++1          CAX      2,3
00505  4 62 00371       ++1    M     BSP      *(F08)
00506  5 22 00420       0365         CAX      *FJN001,1             RESTORE WAA.                   00367
00507  0 14 01243       0366         BNA      G140                  IF (RA)<0, R-S R/M/W WAS UNSUCCESSFUL. 00368

                        0368         RESKED   V96,V96X02,PV96A                                     00370
                        ++1          SETNEP   V96,V96X02,PV96A,FWANPG
                        ++2          SETALL   V96,V96X02,PV96A,FWANPG
00510  0 54 00510       ++3    M3    LDA      =2*FWAELN.P+PV96A*FWAPRI.P
00511  0 01 00176       ++3    M9    ADI      (V96)
00512  1 55 00404       ++3          STA      FWANPG,1
00513  0 54 00450       ++1          LDA      =PV96A
                        ++1    M2    PGLINK   E01,E01X06
00514  3 22 00012       ++2          CAX      10,3
00515  4 62 00202       ++2    M     BSP      *(E01)
```

```
                       0370  *        V57X05 IS SCHEDULE BY TERMSU AFTER ATTEMPTING TO PULL A
                       0371  *         PATH FROM THE UJ TO AN STO.

00516  1 26 00506      0373  V57X05  STX     FJN001.1             SAVE WAA.
00517  0 62 00756      0374          BSP     AB01                 GO CHECK FOR ABORT REQUIRED

                       0376  E010    FLDTST  L.VWFTRB.1.0         WAS TERMSU SUCCESSFUL?
00520  1 54 00210      **1           LDA     VWFTRB.1
00521  0 044 4000      **1   M4      SLNZ    VWFTRB.P/010000
00522  0 11 00527      0377          BUN     E020                 YES.
                       0378          FLDTST  L.VWFTRT.1.1
00523  1 54 00220      **1           LDA     VWFTRT.1
00524  0 040 2000      **1   M5      SLNT    VWFTRT.P/010000
00525  0 11 00010      0379          BUN     A410                 SOFTWARE ERROR
00526  0 11 01254      0380          BUN     G181                 TERMINATING PATH BLOCKAGE

00527  2 22 00335      0382  E020    CAX     RLWAIA.2             READ THE MRA
                       0383          MCCIOM  MRA.3.M.1
                       **1           MCCIO1  MRA.3.M.1.E1
                       **2   E1      EQU     10
                       **2   PA      EQU     2
00530  1 22 00023      **2   B30     CAX     E1+3+5.1
00531  0 64 00326      **2   F01     LDQ     =PA
                       **1           MCCIO3  MRA.3.M.1.E1
                       **2   TEST    EQU     E1+3
00532    03600001      **2   G01     CRR     .RA
                       **1           MCCIO2  MRA.3.M.1
                       **2   ENT1    EQU     0
                       **2   ENT2    EQU     2
                       **2           PGLINK  V01.V01X05
00533  3 22 00010      **3           CAX     8.3
00534  4 62 00311      **3   M       BSP     *(V01)
00535  5 22 00516      0384          CAX     *FJN001.1            RESTORE WAA.
00536  0 14 01247      0385          BNA     G170                 IF (RA)<0. MCCIOM UN-SUCCESSFUL.

                       0387          FLDTST  L.RLWSSX..7          DOES SSX=7?
00537  0 54 00527      **1           LDA     RLWSSX.-
00540  0 50 00336      **1   M6      ANA     RLWSSX.M
00541  0 053 0007      **1           SRNE    7*RLWSSX.P
00542  0 11 00544      0388          BUN     E030                 YES.
00543  0 11 01247      0389          BUN     G170                 NO.

                       0391  E030    FLDTST  L.RLWRFT..1          HAS RFT COME TRUE.
00544  0 54 00544      **1           LDA     RLWRFT.-
00545  0 040 4000      **1   M5      SLNT    RLWRFT.P/010000
00546  0 11 00573      0392          BUN     F020                 YES.

                       0394  *                                    NO. PUT V57X06 ON TIMER QUEUE FOR
                       0395  *                                     50 MILLISECONDS.
                       0396          TIMERB  =3.S.V57.V57X06.PV57A
                       **1           GTIMER  =3.S.V57.V57X06.PV57A
00547  0 54 00513      **2           LDA     =3

00550  1 55 00401      **2           STA     FWAINT.1
                       **2           SETNCF  V57.V57X06.PV57A.FWANPG
                       **3           SEJALL  V57.V57X06.PV57A.FWANPG
00551  0 54 00074      **4   M7      LDA     =6*FWALLN.P+PV57A*FWAPRI.P
00552  0 01 00455      **4   M9      ADI     (V57)
00553  1 55 00512      **4           STA     FWANPG.1
                       **2           FLDSET  L.FWATLR.1.2
00554  1 54 00410      **3           LDA     FWATLR.1
00555  0 50 00406      **3   M6      ANA     FWATLR.0
00556  0 032 0020      **3   M9      ORL     2*FWATLR.P/010000
00557  1 55 00554      **3           STA     FWATLR.1
                       **1           PGLINK  E02.E02X03
00560  3 22 00004      **2           CAX     4.3
00561  4 62 00412      **2   M       BSP     *(E02)

                       0398  *        V57X06 IS SCHEDULE EITHER FROM THE TIMER QUEUE. OR BY
                       0399  *         RIKEMO DUE TO THE RFT COMING TRUE ON THE SPECIFIED RJ.

00562  0 62 00756      0401  V57X06  BSP     AB01                 GO CHECK FOR ABORT REQUIRED
00563  0 54 00544      0402  F010    LDA     RLWRFT               CHECK FOR OCCURRENCE OF RFT.
00564  0 14 00573      0403          BNA     F020                 IF (RA)<0. RFT OCCURRED.
00565  0 64 00565      0404  T010    LDQ     ='010'*VWNTRN.P+T010-T010
                       0405  ***************************************************************
                       0406  *                                                             *
                       0407  * T010--TROUBLE NUMBER  10 OF V57                             *
                       0408  *                                                             *
                       0409  *        NO RFT.                                              *
                       0410  *                                                             *
                       0411  ***************************************************************
00566  0 54 00376      0412  F012    LDA     =1*VWNSPI.P
00567  1 65 00375      0413  F014    STQ     VWNTRN.1
00570  3 22 00001      0414          CAX     1.3
00571  1 55 00377      0415  F016    STA     VWNSPI.1
00572  0 11 01257      0416          BUN     G190

00573  1 26 00535      0418  F020    STX     FJN001.1             SAVE WA ADDRESS.
00574  1 54 00500      0419          LDA     FWARJI.1             RETRIEVE RJ IDENTITY AND PLACE
00575    03610104      0420          CCR     RA.X1                 IN XR1 FOR F08.
00576  0 51 00576      0421          ORA     =010000100              FORMAT RA TO READ TRI WORD OF RJ SLOT.
00577  2 22 00503      0422          CAX     FJN002.2             USE FJN AS BUFFER FOR R-S ACCESS.
                       0423          PGLINK  F08.F08X02
00600  3 22 00002      **1           CAX     2.3
00601  4 62 00505      **1   M       BSP     *(F08)
00602  5 22 00573      0424          CAX     *FJN001.1            RESTORE WAA.
00603  0 14 01243      0425          BNA     G140                 IF (RA)<0. R-S READ WAS UNSUCCESSFUL.
00604  0 54 00604      0426          LDA     FJN004
                       0427          FLDTST  .RJFTRI..6           CHECK FOR EXPECTED TRI=6.
00605  0 50 00241      **1   M6      ANA     RJFTRI.M
00606  0 042 0060      **1   M7      SLNE    6*RJFTRI.P/010000
00607  0 11 00612      0428          BUN     F030                 TRI=6.
00610  0 64 00610      0429  T020    LDQ     ='020'*VWNTRN.P+T020-T020
                       0430  ***************************************************************
                       0431  *                                                             *
                       0432  * T020--TROUBLE NUMBER  20 OF V57                             *
                       0433  *                                                             *
                       0434  *        TRI IS INVALID.                                      *
                       0435  *                                                             *
                       0436  ***************************************************************
```

```
                                   V57  MR MILLER  UJTEST-ATS OJ TEST MODULE                           V57
              1/08/74     TIME :  1:42 PM

00611   0 11 00556   0437             BUN     F012                                                    00439
                     0438   F030      PGLINK  V32,V32X03         REMOVE RJ RE-ROUTES.                 00440
00612   3 22 00004   **1              CAX     4,3
00613   4 62 00077   **1    M         BSP     *(V32)

00614   1 54 00614   0440             LDA     FWACHT,1           RESET WAL AND IPS IN CHT.            00442
00615    03600110    0441             CRR     RA,X2                                                   00443
00616    03610100    0442             CCR     RA,                                                     00444
00617   2 55 00617   0443             STA     CHOIPS,2                                                00445

00620   0 54 00347   0445             LDA     RJFXIN,0           READ/MODIFY/WRITE THE RJ SLOT TO     00447
00621   0 50 00621   0446             ANA     RJFCTR,0            RESET TRI, SET CTR, RESET THE       00448
00622   0 55 00577   0447             STA     FJN002              FREEZE BIT AND WRITE IN=12.         00449
00623   0 54 00463   0448             LDA     RJFXF0,0                                                00450
00624   0 55 00464   0449             STA     FJN003                                                  00451
00625   0 54 00625   0450             LDA     RJFTRI,0                                                00452
00626   0 55 00604   0451             STA     FJN004                                                  00453
00627   0 54 00627   0452             LDA     =12*RJFXIN,P+1*RJFCTR,P                                 00454
00630   0 55 00462   0453             STA     FJN018                                                  00455
00631   0 26 00473   0454             STX     FJN019,0                                                00456
00632   0 26 00632   0455             STX     FJN020,0                                                00457
00633   1 54 00574   0456             LDA     FWARJI,1                                                00458
00634    03600104    0457             CRR     RA,X1                                                   00459
00635   2 22 00622   0458             CAX     FJN002,2                                                00460
00636   0 54 00636   0459             LDA     =070000042                                              00461
                     0460             PGLINK  F08,F08X02                                              00462
00637   3 22 00002   **1              CAX     2,3
00640   4 62 00601   **1    M         BSP     *(F08)
00641   5 22 00372   0461             CAX     *RLWWAS,1          RESTORE WA                           00463
00642   0 14 01243   0462             BNA     G140               IF (R)<0, R-S R/M/W WAS UNSUCCESSFUL. 00464
00643   0 45 00036   0463             SOM     RLWRJS             INDICATE NO RJ TO SPEARS             00465
00644   0 54 00342   0464             LDA     RLWSTM                                                  00466
00645   0 50 00343   0465             ANA     RLWSTM,M           IS STM = 1 ?                         00467
00646   0 41 00344   0466             SUB     =1*RLWSTM,P                                             00468
00647   0 13 00651   0467             BZA     F034               YES, GO TO TIMER                     00469
00650   0 11 00664   0468             BUN     F031               NO, GO SET RR                        00470
                     0469   F034      TIMERB  =13,S,V57,V57X07,PV57A                                  00471
                     **1              GTIMER  =13,S,V57,V57X07,PV57A
00651   0 54 00651   **2              LDA     =13
00652   1 55 00550   **2              STA     FWAINT,1
                     **2              SETNEP  V57,V57X07,PV57A,FWANPG
                     **3              SETALL  V57,V57X07,PV57A,FWANPG
00653   0 54 00117   **4    M8        LDA     =7*FWAELN,P+PV57A*FWAPRI,P
00654   0 01 00552   **4    M9        ADI     (V57)
00655   1 55 00553   **4              STA     FWANPG,1
                     **2              FLDSET  1,FWATLR,1,2
00656   1 54 00557   **3              LDA     FWATLR,1
00657   0 50 00555   **3    M6        ANA     FWATLR,D
00660   0 032 0020   **3    M9        ORL     2*FWATLR,P/010000
00661   1 55 00656   **3              STA     FWATLR,1
                     **1              PGLINK  E02,E02X03
00662   3 22 00004   **2              CAX     4,3
00663   4 62 00561   **2    M         BSP     *(E02)

00664   0 54 00653   0471   F031      LDA     =7*FWAELN,P+PV57A*FWAPRI,P                              00473
00665   0 01 00654   0472             ADI     (V57)                 MANIAC TO SCHEDULE                00474
00666   1 55 00666   0473             STA     FWAERP,1                            V57X07              00475
00667    03600401    0474             CRR     X1,RA              SAVE WORK AREA ADDRESS               00476
00670   0 032 4000   0475             ORL     04000                                                   00477
00671   0 55 00624   0476             STA     FJN003                                                  00478
00672   0 54 00672   0477             LDA     =SL675                                                  00479

00673   0 55 00635   0478             STA     FJN002                                                  00480
00674   2 22 00673   0479             CAX     FJN002,2                                                00481
                     0480             MANSET  RR                                                      00482
00675    03604002    **1              CRR     PC,RO
00676   1 22 00003   **1    Y1        CAX     Y2-Y1,1
                     **1              PGLINK  L00,L00X05
00677   3 22 00010   **2              CAX     8,3
00700   4 62 00700   **2    M         BSP     *(L00)
00701   0 11 01262   0481             BUN     G200               MANIAC REQUEST DENIED.               00483

00702   0 54 00644   0483             LDA     RLWSTM                                                  00485
00703   0 50 00645   0484             ANA     RLWSTM,M                                                00486
00704   0 41 00704   0485             SUB     =4*RLWSTM,P        STM = 4 OR 12 ?                      00487
00705   0 13 00711   0486             BZA     F035               YES, 4                               00488
00706   0 41 00706   0487             SUB     =8*RLWSTM,P                                             00489
00707   0 13 00711   0488             BZA     F035               YES, 12                              00490
00710   0 11 00717   0489             BUN     F032               NO,GO SET ONLY G02 BIT               00491
00711   0 54 00301   0490   F035      LDA     RLWCSK,M           IS THIS A STUCK-COIN TEST?           00492
00712   0 70 00474   0491             SMNT    RLWCSK                                                  00493
00713   0 11 00717   0492             BUN     F032               YES GO SET G02 BIT                   00494
00714   0 54 00714   0493             LDA     RLWG04,M           NO, SET G04 BEFORE G02               00495
00715   0 51 00702   0494             ORA     RLWG04                                                  00496
00716   0 55 00715   0495             STA     RLWG04                                                  00497
00717   0 54 00716   0496   F032      LDA     RLWG02                                                  00498
00720   0 51 00720   0497             ORA     RLWG02,M                                                00499
00721   0 55 00717   0498             STA     RLWG02                                                  00500
00722   1 22 00001   0499             CAX     1,1                SUB-REQUEST NO.=1, WRITE IN MRAD-A.  00501
00723   2 22 00721   0500             CAX     RLWG02,2           PLACE BUFFER ADDRESS IN XR2.         00502
                     0501             MCCIOM  MRA,2,H,I                                               00503
                     **1              MCCIO1  MRA,2,H,I,E1
                     **2    E1        EQU     10
                     **2    PA        EQU     2
00724   1 20 00013   **2    B20       ADX     E1+2-1,1
00725   0 64 00531   **2    F01       LDQ     =PA
                     **1              MCCIO3  MRA,2,H,I,E1
                     **2    TEST      EQU     E1+2
00726    03600001    **2    G01       CRR     ,RA
                     **1              MCCIO2  MRA,2,H,I
                     **2    ENT1      EQU     0
                     **2    ENT2      EQU     2
                     **2              PGLINK  V01,V01X05
00727   3 22 00010   **3              CAX     8,3
00730   4 62 00534   **3    M         BSP     *(V01)
00731   5 22 00602   0502             CAX     *FJN001,1          RESTORE WAA.                         00504
00732   0 14 01267   0503             BNA     G170               IF (RA)<0, MCCIOM UN-ABLE TO WRITE MRL. 00505
```

```
                              V57   MA MILLER  OJTEST-ATS OJ TEST MODULE                  V57
          1/08/74    TIME : .1:42 PM

                        0506  F033    FLDTST  L,RLWSTM,,2
00733  0 54 00723       **1           LDA     RLWSTM,-
00734  0 50 00703       **1   M6      ANA     RLWSTM,M
00735  0 043 0100       **1           SANE    2*RLWSTM.P

00736  0 11 00741       0507          BUN     F040              STM=2

00737  0 54 00737       0508          LDA     =180              SET TIME FOR 3 SEC.
00740  0 11 00742       0509          BUN     F050
00741  0 54 00741       0510  F040    LDA     =9                STM=1 OR 2, PREPARE TO TIME FOR
00742  0 55 00674       0511  F050    STA     FJN002             150 MILLISECONDS.

                        0513          TIMERB  FJN002,S,V57,V57X08,PV57A
                        **1           GTIMER  FJN002,S,V57,V57X08,PV57A
00743  0 54 00742       **2           LDA     FJN002
00744  1 55 00652       **2           STA     FWAINT,1
                        **2           SETNEP  V57,V57X08,PV57A,FWANPG
                        **3           SETALL  V57,V57X08,PV57A,FWANPG
00745  0 54 00402       **4   M91     LDA     =PV57A*FWAPRI.P
00746  0 01 00565       **4   M9      ADI     (V57)
00747  1 55 00655       **4           STA     FWANPG,1
                        **2           FLDSET  L,FWATLR,1,2
00750  1 54 00661       **3           LDA     FWATLR,1
00751  0 50 00657       **3   M6      ANA     FWATLR,0
00752  0 032 0020       **3   M9      ORL     2*FWATLR.P/010000
00753  1 55 00750       **3           STA     FWATLR,1
                        **1           PGLINK  E02,E02X03
00754  3 22 00004       **2           CAX     4,3
00755  4 62 00663       **2   M       BSP     *(E02)

                        0515  * SUBROUTINE TO CHECK FOR THE ABORT COMMAND
                        0516  AB01    NPRNDS  0
                        **1           TORP
00756  00000000         **1           NOS     0
                        **1           PROT
00757  0 54 00757       0517          LDA     RLWABF            IS THE ABORT FLAG SET
00760  0 50 00760       0518          ANA     RLWABF.M
00761  4 13 00756       0519          BZA     *AB01             NO,RETURN
00762  0 122 0001       0520          LLA     1                 YES, IS TROUBLE RS SYSTEM TROUBLE
00763  0 14 00765       0521          BNA     T050              YES,GO SET UP TROUBLE NUMBER
00764  0 11 01245       0522          BUN     G160              NO,GO SET UP FOR THIS ABORT
00765  0 64 00765       0523  T050    LDQ     =!050!*VWNTRN.P
                        0524  ****************************************************************
                        0525  *                                                              *
                        0526  * T050--TROUBLE NUMBER 50 OF V57                               *
                        0527  *                                 RS-SYSTEM TROUBLE            *
                        0528  *                                                              *
                        0529  ****************************************************************
00766  0 11 00566       0530          BUN     F012              GO SET UP FOR TRN

                        0532  *       V57X07 IS SCHEDULED BY THE MRL INTERRUPT HANDLER
                        0533  *        AFTER AN MRL READY INTERRUPT.

00767  1 26 00711       0535  V57X07  STX     FJN001,1          SAVE WA ADDRESS.
00770  0 62 00756       0536          BSP     AB01              GO CHECK FOR ABORT REQUIRED

00771  0 54 00733       0538  G001    LDA     RLWSTM
00772  0 50 00734       0539          ANA     RLWSTM.M
00773  0 41 00267       0540          SUB     =2*RLWSTM.P       STM = 1 ?
00774  0 15 01032       0541          BPA     G005              NO, GO READ MRA
00775  0 54 00672       0542          LDA     =SL675            YES, SET RO ON MRL INTERRUPT
                        0543          MANSET  RO
00776    03604002       **1           CRR     PC,RO
00777  1 22 00003       **1    Y1      CAX     Y2-Y1,1
                        **1           PGLINK  L00,L00X03
01000  3 22 00004       **2           CAX     4,3
01001  4 62 00700       **2    M      BSP     *(L00)
01002  0 11 01262       0544          BUN     G200              MANIAC FAILED
01003  0 54 00355       0545          LDA     RLWG03.M          SET G03 IN MRL.
01004  0 51 00771       0546          ORA     RLWG03
01005  0 55 01004       0547          STA     RLWG03
01006  1 22 00001       0548          CAX     1,1
01007  2 22 01005       0549          CAX     RLWG03,2
                        0550          MCCIUH  MRA,2,H,1         WRITE G03 TO MRL
                        **1           MCCI01  MRA,2,H,1,E1
                        **2    E1     EQU     10
                        **2    PA     EQU     2
01010  1 20 00013       **2    B20    ADX     E1+2-1,1
01011  0 64 00725       **2    F01    LDQ     =PA
                        **1           MCCI03  MRA,2,H,1,E1
                        **2    TEST   EQU     E1+2
01012    03600001       **2    G01    CRR     ,RA
                        **1           MCCI02  MRA,2,H,1
                        **2    ENT1   EQU     0
                        **2    ENT2   EQU     2
                        **2           PGLINK  V01,V01X05
01013  3 22 00010       **3           CAX     8,3
01014  4 62 00730       **3    M      BSP     *(V01)
01015  5 22 00641       0551          CAX     *RLWWAS,1         RESTORE WA.
01016  0 14 01247       0552          BNA     G170              I/O FAILURE
01017  0 54 00775       0553          LDA     =SL675
                        0554          MANCHK
01020    03600112       **1           CRR     RA,X2++RQ
01021  2 54 01021       **1           LDA     MMN,2
01022    03600110       **1           CRR     RA,X2
01023  0 13 01026       **1           BZA     E1
01024    03604001       **1           CRR     PC,RA
01025  4 62 01025       **1           BSP     *(L09)
01026    03600201       **1    E1     CRR     RO,RA
01027  5 22 01015       0555           CAX     *RLWWAS,1         RESTORE WA
01030  2 32 01032       0556           BZX     G005,2            NO MANIACS GO READ MRA
```

```
                          V57   HR MILLER  OJTEST-ATS OJ TEST MODULE                          V57
           1/08/74     TIME :  1342 PM
01031  0 11 01247   0558            BUN    G170              NO INTERRUPT MRL ERROR      LJP 9/19/73       00560
01032  2 22 00537   0560  G005      CAX    RLWAIA,2                                                        00562
                    0561            MCCIOH MRA,3,H,1                                                       00563
                    ++1             MCCIOI MRA,3,H,I,E1
                    ++2   E1        EQU    10
                    ++2   PA        EQU    2
01033  1 22 00022   ++2   B50       CAX    E1+3+5,1
01034  0 64 01011   ++2   F01       LDO    =PA
                    ++1             MCCIO3 MRA,3,H,I,E1
                    ++2   TEST      EQU    E1+3
01035    03600001   ++2   G01       CRK    ,RA
                    ++1             MCCIO2 MRA,3,H,1
                    ++2   ENT1      EQU    0
                    ++2   ENT2      EQU    2
                    ++2             PGLINK V01,V01X05
01036  3 22 00010   ++1             CAX    8,3
01037  4 62 01016   ++3   M         BSP    *(V01)
01040  5 22 01027   0562            CAX    *RLWWAS,1                                     LJP 9/19/73       00564
01041  0 14 01247   0563            BNA    G170              IF (RA)<0, MCCIOH UN-SUCCESSFUL.              00565
01042  0 54 01007   0564            LDA    RLWSTM            IS THE RFI RETURN?                            00566
01043  0 50 00772   0565            ANA    RLWSTM.M                                                        00567
01044  0 41 01073   0566            SUB    =2*RLWSTM.P       STM = 1?                                      00568
01045  0 15 01067   0567            BPA    G004              NO GO CHECK FOR STM OF 2                      00569
01046  0 54 01032   0568            LDA    RLWSSX            YES, IS SSX = 5 ?                             00570
01047  0 50 00540   0569            ANA    RLWSSX.M                                                        00571
01050  0 41 01050   0570            SUB    =5*RLWSSX.P                                                     00572
01051  0 13 01055   0571            BZA    G003              YES                                           00573
                    0572  ****************************************************************                  00574
                    0573  *                                                              *                  00575
                    0574  * T160--TROUBLE NUMBER 160 OF V57                              *                  00576
                    0575  *                                                              *                  00577
                    0576  *                 SSX NOT EQUAL 5 OR INT NOT EQUAL 0           *                  00578
                    0577  *                                                              *                  00579
                    0578  *                                                              *                  00580
                    0579  ****************************************************************                  00581
01052  0 54 01052   0580  T160      LDA    ='160'*VWNTRN.P                                                 00582
01053  1 55 02567   0581            STA    VWNTRN,1                                                        00583
01054  0 11 01135   0582            BUN    G012              GO SET UP FOR THIS ERROR TYPE                 00584
01055  0 54 01646   0583  G003      LDA    RLWINT                                                          00585
01056  0 50 01056   0584            ANA    RLWINT.M                                                        00586
01057  0 13 01061   0585            BZA    G017              OK EXIT WITH ATP.                             00587
01060  0 11 01052   0586            BUN    T160              NO, GO SET UP FOR THIS ERROR                  00588
01061  0 54 01061   0587  G017      LDA    RLWBZZ            CHECK B RELAY TRUE, BF NOT AND DT NOT         00589
01062  2 50 01062   0588            ANA    =RLWBZZ.N+*RLWBFZ.N+*RLWDTZ.N                                   00590
01063  0 41 01034   0589            SUB    =1*RLWBZZ.P                                                     00591
01064  0 13 01360   0590            BZA    G126              RELAY STATUS CORRECT,XIT     LJP 9/19/73       00592
                    0591  ****************************************************************                  00593
                    0592  * T040--TROUBLE NUMBER  40 OF V57                              *                  00594
                    0593  *                                                              *                  00595
                    0594  *                    RELAY STATUS IS INCORRECT.                *                  00596
                    0595  *                                                              *                  00597

                    0596  ****************************************************************                  00598
01065  0 64 01065   0597  T040      LDO    ='040'*VWNTRN.P+T040-T040                                       00599
01066  0 11 01135   0598            BUN    G012                                                            00600
                    0599  G004      FLDTST L,RLWSTM,,2       STM=2 ?                                       00601
01067  0 54 01042   ++1             LDA    RLWSTM,=
01070  0 50 01043   ++1   M6        ANA    RLWSTM.M
01071  0 043 0100   ++1             SRNE   2*RLWSTM.P
01072  0 11 01142   0600            BUN    G040              STM=2.                                        00602
01073  0 54 00712   0601            LDA    RLWCSK                                                          00603
01074  0 50 00711   0602            ANA    RLWCSK.M                                                        00604
01075  0 13 01173   0603            BZA    G080              NO, GO CHECK INT VALUE                        00605
01076  0 11 01130   0604            BUN    G010              YES, GO CHECK SEQUENCE STATE.                 00606
01077    03400001   0605  G006      CRK    ,RA                                                             00607
01100  1 55 00240   0606            STA    VWNCKT,1          SET ATP.                                      00608
                    0607            TIMERB =720,S,V31,V31X04,PV31A                                         00609
                    ++1             OTIMER =720,S,V31,V31X04,PV31A
01101  0 54 01101   ++2             LDA    =720
01102  1 55 00744   ++2             STA    FWAINT,1
                    ++2             SETNEP V31,V31X04,PV31A,FWANPG
                    ++3             SETALL V31,V31X04,PV31A,FWANPG
01103  0 54 00172   ++4   M8        LDA    =4*FWALLN.P+PV31A0FWAPRI.P
01104  0 01 01104   ++4   M9        AOI    (V31)
01105  1 55 00747   ++4             STA    FWANPG,1
                    ++2             FLDSET L,FWATLR,1,2
01106  1 54 00753   ++3             LDA    FWATLR,1
01107  0 50 00751   ++3   M6        ANA    FWATLR.O
01110  0 032 0020   ++3   M9        ORL    2*FWATLR.P/010000
01111  1 55 01106   ++3             STA    FWATLR,1
                    ++1             PGLINK E02,E02X03
01112  3 22 00006   ++2             CAX    6,3
01113  4 62 00755   ++2   M         BSP    *(E02)

                    0610  * RETURN FROM MRL INTERRUPT OR TIMER                                             00612
01114  0 62 00756   0611  V57X0A    BSP    AB01              GO CHECK FOR ABORT REQUIRED                   00613
01115  0 54 01073   0612  G130      LDA    RLWCSK                                                          00614
01116  0 50 01074   0613            ANA    RLWCSK.M                                                        00615
01117  0 11 01121   0614            BZA    G125                                                            00616
01120  0 11 01032   0615            BUN    G005              YES,GO READ MRL BUFFERS                       00617
01121  0 54 01067   0616  G125      LDA    RLWSTM                                                          00618
01122  0 50 01070   0617            ANA    RLWSTM.M          IS STM = 1                                    00619
01123  0 41 00646   0618            SUB    =1*RLWSTM.P                                                     00620
01124  3 22 00001   0619            CAX    1,3               SET ERROR CODE                                00621
01125  0 13 01257   0620            BZA    G190              YES GO SET UP TROUBLE NUMBER FOR THIS ERROR   00622
01126  0 64 01126   0621  T170      LDO    ='170'*VWNTRN.P+T170-T170      SET TROUBLE #                    00623
                    0622  ****************************************************************                  00624
                    0623  *                                                              *                  00625
                    0624  *T170--TROUBLE NUMBER 170 FOR V57 UNIT FAILED                  *                  00626
                    0625  *                                                              *                  00627
                    0626  *                                                              *                  00628
                    0627  ****************************************************************                  00629
```

```
                              V57   MR MILLER  UJTEST-ATS OJ TEST MODULE                       V57
             1/08/74.    TIME :  1:42 PM

01127  0 11 01135   0628            BUN      G012
                    0629   G010     FLDTST   L,RLWSSX,,18
01130  0 54 01055   ++1             LDA      RLWSSX,-
01131  0 50 01047   ++1    M6       ANA      RLWSSX,M
01132  0 043 0022   ++1             SRNE     18*RLWSSX,P
01133  0 11 01077   0630            BUN      G006                SSX=18.
01134  0 64 01134   0631   T030     LDQ      ='030'*VWNTRN,P+T030-T030
                    0632   ******************************************************
                    0633   *                                                    *
                    0634   * T030--TROUBLE NUMBER  30 OF V57                    *
                    0635   *                                                    *
                    0636   *                                                    *
                    0637   *                                                    *
                    0638   ******************************************************
01135  0 54 01116   0639   G012     LDA      =2*VWNSPI,P
01136  0 11 00567   0640            BUN      F014
01137  0 77 00445   0641   G021     SMMN     RLWJK2              REJ OJ ?
01140  0 11 01305   0642            BUN      G120                YES, GO CHECK SCAN POINTS
01141  0 11 01155   0643            BUN      G060                NO, GO CHECK CTT STATUS.

                    0645   G040     FLDTST   L,RLWINT,,0         DOES INT=0?
01142  0 54 01130   ++1             LDA      RLWINT,-
01143  0 50 01056   ++1    M6       ANA      RLWINT,M
01144  0 043 0000   ++1             SRNE     0*RLWINT,P
01145  0 11 01150   0646            BUN      G050                YES.
01146  0 64 01146   0647   T060     LDQ      ='060'*VWNTRN,P+T060-T060
                    0648   ******************************************************
                    0649   *                                                    *
                    0650   * T060--TROUBLE NUMBER  60 OF V57                    *
                    0651   *                                                    *
                    0652   *                                                    *
                    0653   *                                                    *
                    0654   ******************************************************
01147  0 11 01135   0655            BUN      G012
                    0656   G050     FLDTST   L,RLWSSX,,13        DOES SSX=13?
01150  0 54 01142   ++1             LDA      RLWSSX,-
01151  0 50 01131   ++1    M6       ANA      RLWSSX,M
01152  0 043 0015   ++1             SRNE     13*RLWSSX,P
01153  0 11 01137   0657            BUN      G021                YES.
01154  0 11 01247   0658            BUN      G170                MRL ERROR.              LJP 9/19/73
                    0659   G060     FLDTST   L,RLWCTT,,1         DETERMINE CTT.
01155  0 54 01115   ++1             LDA      RLWCTT,-
01156  0 50 00475   ++1    M6       ANA      RLWCTT,M
01157  0 043 0001   ++1             SRNE     1*RLWCTT,P
01160  0 11 01166   0660            BUN      G070                CTT=1.
                    0661            FLDTST   L,RLWHZZ,,0         CTT=4,H SHOULD BE RESET.
01161  0 54 01061   ++1             LDA      RLWHZZ,-
01162  0 045 0010   ++1             SRNZ     RLWHZZ,M
01163  0 11 01305   0662            BUN      G120                H RESET, OJ PASSED TEST.
01164  0 64 01164   0663   T080     LDQ      ='080'*VWNTRN,P+T080-T080
                    0664   ******************************************************
                    0665   *                                                    *

                    0666   * T080--TROUBLE NUMBER  80 OF V57                    *
                    0667   *                                                    *
                    0668   *                                                    *
                    0669   *                                                    *
                    0670   ******************************************************
01165  0 11 01135   0671            BUN      G012
                    0672   G070     FLDTST   L,RLWHZZ,,1         CTT=1, H SHOULD BE SET.
01166  0 54 01161   ++1             LDA      RLWHZZ,-
01167  0 041 0010   ++1             SRNI     RLWHZZ,M
01170  0 11 01305   0673            BUN      G120                H SET, OJ PASSED TEST.
01171  0 64 01171   0674   T090     LDQ      ='090'*VWNTRN,P+T090-T090
                    0675   ******************************************************
                    0676   *                                                    *
                    0677   * T090--TROUBLE NUMBER  90 OF V57                    *
                    0678   *                                                    *
                    0679   *                                                    *
                    0680   *                                                    *
                    0681   ******************************************************
01172  0 11 01135   0682            BUN      G012
                    0683   G080     FLDTST   L,RLWINT,,0         DOES INT=0?
01173  0 54 01150   ++1             LDA      RLWINT,-
01174  0 50 01143   ++1    M6       ANA      RLWINT,M
01175  0 043 0000   ++1             SRNE     0*RLWINT,P
01176  0 11 01201   0684            BUN      G090                YES.
01177  0 64 01177   0685   T100     LDQ      ='100'*VWNTRN,P+T100-T100
                    0686   ******************************************************
                    0687   *                                                    *
                    0688   * T100--TROUBLE NUMBER 100 OF V57                    *
                    0689   *                                                    *
                    0690   *                                                    *
                    0691   *                                                    *
                    0692   ******************************************************
01200  0 11 01135   0693            BUN      G012
                    0694   G090     FLDTST   L,RLWSSX,,21               SSX = 21 ?
01201  0 54 01173   ++1             LDA      RLWSSX,-
01202  0 50 01151   ++1    M6       ANA      RLWSSX,M
01203  0 043 0025   ++1             SRNE     21*RLWSSX,P
01204  0 11 01207   0695            BUN      G100                YES.
01205  0 64 01205   0696   T110     LDQ      ='110'*VWNTRN,P+T110-T110
                    0697   ******************************************************
                    0698   *                                                    *
                    0699   * T110--TROUBLE NUMBER 110 OF V57                    *
                    0700   *                                                    *
                    0701   *                                                    *
                    0702   *                                                    *
                    0703   ******************************************************
01206  0 11 01135   0704            BUN      G012
                    0705   G100     FLDTST   L,RLWSTM,,4         DETERMINE STM.
01207  0 54 01121   ++1             LDA      RLWSTM,-
01210  0 50 01122   ++1    M6       ANA      RLWSTM,M
01211  0 043 0200   ++1             SRNE     4*RLWSTM,P
01212  0 11 01231   0706            BUN      G110                STM=4.
```

```
                         V57   MR MILLER  OJTEST-ATS OJ TEST MODULE                              V57
          1/08/74     TIME :  1:42 PM

                      0707            FLDTST  L,RLWCTT,,7       STM=12, DETERMINE CTT USED.              00709
01213  0 54 01155     **1             LDA     RLWCTT,-
01214  0 50 01156     **1    M6       ANA     RLWCTT,M
01215  0 043 0007     **1             SRNE    7*RLWCTT,P
01216  0 11 01231     0708            BUN     G110              CTT=7.                                   00710
01217  0 64 01217     0709   T120     LDQ     ='120'*VWNTRN,P+T120-T120  POSSIBLE TROUBLE NUMBER.        00711
                      0710            FLDTST  L,RLWCCT,,0       CTT=5.                                   00712
01220  0 54 01220     **1             LDA     RLWCCT,-
01221  0 045 0001     **1             SRNZ    RLWCCT,N
                      0711   ************************************************************                00713
                      0712   *                                                          *                00714
                      0713   * T120--TROUBLE NUMBER 120 OF V57                                           00715
                      0714   *                                                          *                00716
                      0715   *                                                          *                00717
                      0716   *                                                          *                00718
                      0717   ************************************************************                00719
01222  0 11 01135     0718            BUN     G012                                                       00720
01223  0 64 01223     0719   T130     LDQ     ='130'*VWNTRN,P+T130-T130  POSSIBLE TROUBLE NUMBER.        00721
                      0720            FLDTST  L,RLWCCR,,0                                                00722
01224  0 54 01220     **1             LDA     RLWCCR,-
01225  0 045 0004     **1             SRNZ    RLWCCR,N
                      0721   ************************************************************                00723
                      0722   *                                                          *                00724
                      0723   * T130--TROUBLE NUMBER 130 OF V57                                           00725
                      0724   *                                                          *                00726
                      0725   *                                                          *                00727
                      0726   *                                                          *                00728
                      0727   ************************************************************                00729
01226  0 11 01135     0728            BUN     G012                                                       00730
01227  0 11 01305     0729            BUN     G120              OJ PASSED TEST.                          00731
01230  0 64 01230     0730   T140     LDQ     ='140'*VWNTRN,P+T140-T140  POSSIBLE TROUBLE NUMBER.        00732
                      0731   G110     FLDTST  L,RLWCRT,,0                                                00733
01231  0 54 01224     **1             LDA     RLWCRT,-
01232  0 045 0002     **1             SRNZ    RLWCRT,N
                      0732   ************************************************************                00734
                      0733   *                                                          *                00735
                      0734   * T140--TROUBLE NUMBER 140 OF V57                                           00736
                      0735   *                                                          *                00737
                      0736   *                                                          *                00738
                      0737   *                                                          *                00739
                      0738   ************************************************************                00740
01233  0 11 01135     0739            BUN     G012                                                       00741
01234  0 64 01234     0740   T150     LDQ     ='150'*VWNTRN,P+T150-T150  POSSIBLE TROUBLE NUMBER.        00742
                      0741            FLDTST  L,RLWCRR,,0                                                00743
01235  0 54 01231     **1             LDA     RLWCRR,-
01236  0 045 0010     **1             SRNZ    RLWCRR,N
                      0742   ************************************************************                00744
                      0743   *                                                          *                00745
                      0744   * T150--TROUBLE NUMBER 150 OF V57                                           00746
                      0745   *                                                          *                00747
                      0746   *                                                          *                00748
                      0747   *                                                          *                00749

                      0748   ************************************************************                00750
01237  0 11 01135     0749            BUN     G012                                                       00751
01240  0 11 01360     0750            BUN     G126                                     LJP 9/19/73       00752

01241  3 22 00000     0752   G121     CAX     0,3               SET SUCCESS FLAG                         00754
01242  0 11 01257     0753            BUN     G190                                                       00755
01243  3 22 00002     0754   G140     CAX     2,3               SET R-S R/M/W ERROR INDICATOR.           00756
01244  0 11 01257     0755            BUN     G190                                                       00757
01245  3 22 00004     0756   G160     CAX     4,3               SET PROGRAM ABORT INDICATOR.             00758
01246  0 11 01257     0757            BUN     G190                                                       00759
01247  3 22 00005     0758   G170     CAX     5,3               SET MRL ERROR INDICATOR.                 00760
01250  0 11 01257     0759            BUN     G190                                                       00761
01251  3 22 00006     0760   G180     CAX     6,3                                                        00762
01252  0 54 00566     0761            LDA     =1*VWNSPI,P                                                00763
01253  0 11 01256     0762            BUN     G183                                                       00764
01254  3 22 00007     0763   G181     CAX     7,3               SET TERMINATING PATH BLOCKAGE INDICATOR.  00765
01255  0 54 01135     0764            LDA     -=2*VWNSPI,P                                               00766
01256  1 55 00571     0765   G183     STA     VWNSPI,1                                                   00767
01257    03602002     0766   G190     CRR     X3,RQ                  PLACE INDICATOR IN ERROR TYPE.      00768
01260  1 65 01100     0767            STQ     VWNERT,1                                                   00769
01261  0 11 01270     0768            BUN     G210                                                       00770
01262  5 22 01040     0769   G200     CAX     *RLWWAS,1         RESTORE WAA.             LJP 9/19/73     00771
01263  0 64 01263     0770            LDQ     ='L00'                 EXHIBIT:                            00772
01264  1 65 00307     0771            STQ     VWNPDT,1                 SECONDARY PROGRAM                 00773
01265  0 64 00471     0772            LDQ     FJN003                   SEARCH KEY                        00774
01266  0 54 00743     0773            LDA     FJN002                   RESULT                            00775
01267  0 11 00064     0774            BUN     A400                                                       00776

01270  1 26 00767     0776   G210     STX     FJN001,1          REMOVE MRL INTERRUPT REROUTE             00778
01271  0 54 01017     0777            LDA     =SL675             IF PRESENT.                             00779
                      0778            MANKST  RR                                                         00780
01272    03604002     **1             CRR     YC,RQ
01273  1 22 00003     **1    X1       CAX     X2-X1,1
                      **1             PGLINK  L00,L00X06
01274  3 22 00012     **2             CAX     10,3
01275  4 62 01001     **2    M        BSP     *(L00)
01276  5 22 01270     0779            CAX     *FJN001,1                                                  00781
                      0780            RESKED  V31,V31X04,PV57A                                           00782
                      **1             SETNEP  V31,V31X04,PV57A,FWANPG
                      **2             SETALL  V31,V31X04,PV57A,FWANPG
01299  0 54 01103     **3    M5       LDA     =4*FWAELN,P+PV57A*FWAPRI,P
01300  0 01 01104     **3    M9       ADI     (V31)
01301  1 55 01105     **3             STA     FWANPG,1
01302  0 54 01214     **1             LDA     =PV57A
                      **1    M2       PGLINK  E01,E01X06
01303  3 22 00012     **2             CAX     10,3
01304  4 62 00515     **2    M        BSP     *(E01)
                      0781   * CHECK STATUS OF TK1 AND COMPUTE CORRECT STATE                             00783
01305  0 54 00310     0782   G120     LDA     RLWW13            GET SCAN POINTS                          00784
01306  0 13 01241     0783            AZA     G121              NO POINTS EXIT                           00785
01307  0 54 00264     0784            LDA     RLWJK4            TK1 MADE AT START OF ROUTINE             00786
```

```
                         V57   MR MILLER  OJTEST-ATS OJ TEST MODULE                              V57
          1/08/74    TIME :  1:42 PM

 01310  0 13 01314   0785          BZA      G122             NO.CONT.                                          00787
                     0786  ************************************************************************          00788
                     0787  *                                                                      *          00789
                     0788  * T200--TROUBLE NUMBER 200 FOR V57 TK1 MADE AT START OF ROUTINE        *          00790
                     0789  *                                                                      *          00791
                     0790  *                                                                      *          00792
                     0791  ************************************************************************          00793
 01311  0 54 01311   0792  T200    LDA      ='T200'*VWNTRN.P+T200-T200                                      00794
 01312  1 55 01053   0793          STA      VWNTRN,1                                                         00795
 01313  0 11 01346   0794          BUN      G171                                                             00796
 01314  0 54 01207   0795  G122    LDA      RLWSTM           GET STM                      LJP 9/19/73        00797
 01315  0 50 01210   0796          ANA      RLWSTM.M                                      LJP 9/19/73        00798
 01316  0 73 01044   0797          SANG     =2*RLWSTM.P      IS THIS A COIN TEST?         LJP 9/19/73        00799
 01317  0 11 01360   0798          BUN      G126             YES,BYPASS TICKET CHECK.     LJP 9/19/73        00800

 01320  0 54 01305   0800          LDA      RLWW13           SET UP SCANNER HANDLER                          00802
 01321  1 55 00245   0801          STA      TWAGSA,1                                                         00803
                     0802          SCANNR   NORMAL                                                           00804
                     **1   DIR     EQU      0*FWADIR.P
 01322  0 54 00247   **1           LDA      =DIR+7*FWADNO.P
 01323  1 55 00250   **1   C1      STA      FWADIR,1
                     0803          PGLINK   F72,F72X01                                                       00805
 01324  3 22 00000   **1           C4X      0,3
 01325  4 62 00252   **1   M       BSP      ¢(F72)
 01326  2 31 01310   0804          BNX      G123,2           SUCCESS SCAN,CONT.                              00806
 01327  0 11 00304   0805          BUN      D023             GO CHECK TYPE TROUBLE FROM F70                  00807
 01330  7 22 00257   0806  G123    CAX      *RLWJK5,3        MOVE CLOTSB TO X3            LJP 9/19/73        00808
 01331  0 54 00261   0807          LDA      =1                                                               00809
 01332  3 122 0000   0808          LLA      ,3               SHIFT TO CORRECT POSITION                       00810
 01333  1 70 01102   0809          SMNT     TWAACT,1         IS TK1 MADE?                                    00811
 01334  0 11 01342   0810          BUN      G124             YES, GO CHECK CORRECT STATUS                    00812
 01335  0 54 00302   0811          LDA      RLWJK3           NO, SHOULD TK1 BE MADE?                         00813
 01336  0 14 01360   0812          BNA      G126             NO, PASS, GO CHECK TYPE OF TEST                 00814
                     0813  ************************************************************************          00815
                     0814  * T220--TROUBLE NUMBER 220 OF V57- TK1 OPEN SHOULD BE MADE AT THIS POINT *        00816
                     0815  *                                                                      *          00817
                     0816  *                                                                      *          00818
                     0817  *                                                                      *          00819
                     0818  ************************************************************************          00820
 01337  0 54 01337   0819  T220    LDA      ='T220'*VWNTRN.P+T220-T220   SET TROUBLE NUMBER                 00821
 01340  1 55 01312   0E?0          STA      VWNTRN,1                                                         00822
 01341  0 11 01346   0821          BUN      G171                                                             00823

 01342  0 54 01335   0823  G124    LDA      RLWJK3                                                           00825
 01343  0 13 01360   0824          BZA      G126             PASS,MADE,GO CHECK TYPE OF TEST                 00826
                     0825  ************************************************************************          00827
                     0826  * T210--TROUBLE NUMBER 210 OF V57- TK1 MADE SHOULD BE OPEN AT THIS POINT *        00828
                     0827  *                                                                      *          00829
                     0828  *                                                                      *          00830
                     0829  *                                                                      *          00831
                     0830  ************************************************************************          00832

 01344  0 54 01344   0831  T210    LDA      ='T210'*VWNTRN.P+T210-T210   SET TROUBLE NUMBER                 00833
 01345  1 55 01340   0832          STA      VWNTRN,1                                                         00834
 01346  0 54 01320   0833  G171    LDA      RLWW13           USE SCAN POINTS FOR DATA DUMP                   00835
 01347  1 55 00305   0834          STA      VWNPRO,1                                                         00836
 01350  0 54 01063   0835          LDA      =2*VWNNOE.P                                                      00837
 01351  1 55 01256   0836          STA      VWNNOE,1         SET # OF DATA WORDS IN DUMP                     00838
 01352  7 22 01330   0837          CAX      *RLWJK5,3        MOVE CLOTSB TO X3            LJP 9/19/73        00839
 01353  0 54 01331   0838          LDA      =1                                            LJP 9/19/73        00840
 01354  3 122 0000   0839          LLA      0,3              SETUP BIT MASK               LJP 9/19/73        00841
 01355  1 55 01264   0840          STA      VWNPOT,1                                                         00042
 01356  3 22 00001   0841          CAX      1,3              SET ERROR INDICATOR                             00843
 01357  8 11 01257   0842          BUN      G190             HANDLE AND XIT                                  00844

                     0844  * TEST PASSED,IF TEST WAS COIN OJ, SET UP TO RUN TEST ON SAME OJ BUT AS           00846
                     0845  *                        A REG OJ TYPE.                                           00847
 01360  0 54 01314   0846  G126    LDA      RLWSTM                 TEST TYPE COIN ?                          00848
 01361  0 50 01315   0847          ANA      RLWSTM.M                                                         00849
 01362  0 41 00704   0848          SUB      =4*RLWSTM.P      IS OJ TYPE COIN                                 00850
 01363  0 13 01367   0849          BZA      G127             YES,GO SET UP TO TEST AS REG OJ                 00851
 01364  0 41 00706   0850          SUB      =8*RLWSTM.P                                                      00852
 01365  0 13 01367   0851          BZA      G127             YES,GO SET UP FOR REG OJ TEST                   00853
 01366  0 11 01241   0852          BUN      G121             NO, END OF TEST, XIT                            00854

 01367  0 77 01213   0854  G127    SMNN     RLWJK1           IS THIS A COIN STUCK TEST?   LJP 9/19/73        00856
 01370  0 11 01241   0855          BUN      G121             YES,TEST DONE .              LJP 9/19/73        00857
 01371  0 54 01271   0856          LDA      =SL675                                                           00858
                     0857          MANRST   RR                                                               00859
 01372    03604002   **1           CRR      PC,RO
 01373  1 22 00003   **1   X1      CAX      X2-X1,1
                     **1           PGLINK   L00,L00X06
 01374  3 22 00012   **2           CAX      10,3
 01375  4 62 01275   **2   M       BSP      ¢(L00)
 01376  5 22 01262   0858          CAX      *RLWWAS,1                                                        00860
 01377  0 54 01137   0859          LDA      RLWXMS           SAVE REQUIRED DATA.                             00861
 01400  0 55 01266   0860          STA      FJN002                                        LJP 9/19/73        00862
 01401  0 54 01352   0861          LDA      RLWJK5                                        LJP 9/19/73        00864
 01402  0 55 01402   0862          STA      FJN005                                        LJP 9/19/73        00865
 01403  3 23 00026   0863          CSX      026,3                                                            00866
 01404    03610001   0864          CCR      ,RA
 01403  3 55 01401   0865  G128    STA      RLWJK5,3                                      LJP 9/19/73        00867
 01406  3 24 01410   0866          IRP      G192,3                                                           00868
 01407  0 11 01403   0867          BUN      G128                                                             00869

                     0869  * CLEAR WA, SAVE REQUIRED DATA FIRST                                              00871
 01410  0 54 01400   0870  G192    LDA      FJN002                                                           00872
 01411  0 032 4000   0871          ORL      04000            SET REG OJ BIT               LJP 9/19/73        00873
 01412  0 55 01377   0872          STA      RLWXMS           RESTORE   XMS                                   00874
```

```
                          V57   HR MILLER  OJTEST-ATS OJ TEST MODULE                             V57
          1/08/74     TIME :  1:42 PM

 01413  1 26 01376   0873          STX      RLWWAS,1          RESTORE   WA                           00875
 01414  0 54 00467   0874          LDA      =-1                                                      00876
 01415  0 55 01415   0875          STA      RLWSRS                                                   00877
 01416  0 55 01346   0876          STA      RLWSRI                               LJP 9/19/73         00878
 01417  0 55 00643   0877          STA      RLWRJS                               LJP 9/19/73         00879
 01420  0 54 01353   0878          LDA      =1*RLWCIT.P                                              00880
 01421  0 55 01367   0879          STA      RLWCIT                                                   00881
 01422  1 54 00447   0880          LDA      VWBBUN,1          SAVE BUN                               00882
 01423  0 55 01265   0881          STA      FJN003                               LJP 9/19/73         00883
 01424  1 54 00166   0882          LDA      VWBBUO,1          SAVE BUO                               00884
 01425  0 55 00626   0883          STA      FJN004                               LJP 9/19/73         00885
 01426  0 54 01426   0884          LDA      =8*RLWMTM.P+2*RLWSTM.P  SET MTM=8 & STM=2                00886
 01427  0 55 01360   0885          STA      RLWMTM                                                   00887
 01430  2 23 00077   0886          CSX      63,2              CLEAR WA.                              00888
 01431    03600001   0887          CRR      ,RA                                                      00889
 01432  1 55 01301   0888  G129    STA      FWAW01,1          CLEAR                                  00890
 01433  2 24 01336   0889          IBP      G131,2
 01434  1 20 00001   0890          ADX      1,1               STEP X1                                00892
 01435  0 11 01432   0891          BUN      G129                                                     00893
 01436  5 22 01413   0892  G131    CAX      *RLWWAS,1         RESTORE WA                             00894
 01437  0 54 01423   0893          LDA      FJN003            RESTORE BUN        LJP 9/19/73         00895
 01440  0 50 01440   0894          ANA      =VWBBUN.N++VWBSBS.N++VWBSEC.N                            00896
 01441  1 55 01422   0895          STA      VWBBUN,1                                                 00897
 01442  0 54 01425   0896          LDA      FJN004                               LJP 9/19/73         00898
 01443  0 50 01443   0897          ANA      =VWBMTX.N+VWBABG.N++VWBBUO.N         LJP 9/19/73         00899
 01444  1 55 01424   0898          STA      VWBMTX,1                                                 00900
 01445  0 54 00024   0899          LDA      =1*FWAELN.P+PV57A*FWAPRI.P                               00901
 01446  0 01 00746   0900          ADI      (V57)                                                    00902
 01447  1 55 00313   0901          STA      FWAW25,1          SAVE RETURN POINT                      00903

                     0903  * RECONSTRUCT OLD LLO ENTRY                                               00905

 01450  0 54 01405   0905          LDA      RLWJKS            MOVE CLOTSB BACK TO WA   LJP 9/19/73   00907
 01451  0 030 0000   0906          ANL      0                                    LJP 9/19/73         00908
 01452  0 122 0021   0907          LLA      CLOTSB.L                             LJP 9/19/73         00909
 01453  1 55 01345   0908          STA      FWA+62,1                             LJP 9/19/73         00910

 01454  0 54 01450   0910          LDA      RLWJKS            MOVE CLOTSX,TSY,TSA TO WA   LJP 9/19/73 00912
 01455  0 031 0000   0911          ANR      0                                    LJP 9/19/73         00913
 01456  1 55 01260   0912          STA      FWA+63,1                             LJP 9/19/73         00914
                     0913          RESKED   V27,V27X04,PV27A   GO TO END SEQ, WILL RESKED SELF,REG OJ  00915
                     ++1           SETNEP   V27,V27X04,PV27A,FWANPG
                     ++2           SETALL   V27,V27X04,PV27A,FWANPG
 01457  0 54 01277   ++3   M5      LDA      =4*FWAELN.P+PV27A*FWAPRI.P
 01460  0 01 00142   ++3   M9      ADI      (V27)
 01461  1 55 01432   ++3           STA      FWANPG,1
 01462  0 54 01302   ++1           LDA      =PV27A
                     ++1   M2      PGLINK   E01,E01X04
 01463  3 22 00012   ++2           CAX      10,3
 01464  4 62 01304   ++2   M       BSP      *(E01)
 01465    00000000   0914          BSS      20                                                       00916
        LITERALS

 01420   00000001
 01350   00000002
 00547   00000003
 00400   00000004
 01050   00000005
 01462   00000007
 00741   00000011
 00365   00000014
 00651   00000015
 00122   00000020
 00235   00000036
 01123   00000040
 01202   00000077
 01316   00000100
 01426   00000110
 01371   00000162
 01362   00000200
 00627   00000214
 00737   00000264
 00425   00000377
 01364   00000400
 01174   00000700
 01361   00000740
 00164   00001200
 01101   00001320
 00125   00002000
 00134   00004000
 01062   00004022
 01322   00007000
 00720   00020000
 01003   00040000
 00714   00100000
 00452   00100400
 00160   00104400
 00443   00120000
 00320   00300000
 00605   01700000
 00510   03200000
 01440   03600017
 00745   07000000
 01445   07100000
 00175   07200000
 00136   07300000
 01457   07400000
 00454   07500000
 00551   07600000
 00664   07700000
 00436   07777400
 00526   10000100
 00441   17000000
```

```
                       V57   HR MILLER  OJTEST-ATS BJ TEST MODULE                    V57
         1/08/74    TIME :  1142 PM

 00255   17400000
 01443   17700007
 01252   20000000
 00231   36000000
 00054   37700000
 01255   60000000
 00565   60000100
 00610   60000200
 01134   60000300
 01065   60000400
 00765   60000500
 01146   60000600
 01164   60001000
 01171   60001100
 01177   60010000
 01205   60010100
 01217   60010200
 01223   60010300
 01230   60010400
 01234   60010500
 01052   60010600
 01126   60010700
 00306   60260702
 00367   60400042
 01263   60430000
 00061   60630001
 00101   60650302
 00304   60650507
 00502   62400042
 00374   63011100
 01311   63020000
 01344   63020100
 01332   63020200
 00636   70000042
 00760   74000000
 00363   72577760
 01107   70077777
 00465   75777777
 00625   76077777
 00623   77577777
 00471   77617777
 00621   77777577
 00167   77777707
 00457   77777737
 00420   77777760
 00170   77777770
 01414   77777777

  COMMON REFERENCES

          COMMON NAME =    AU4       SIZE =      23
 01417   00000017
 01412   00000023
 00135   00000007
 01342   00000024
 01416   00000015
 01307   00000025
 01454   00000026
 01427   00000006
 01421   00000022
 01201   00000000
 01436   00000014
 00563   00000021
 00757   00000020
 01166   00000004
 01235   00000005
 01415   00000016

          COMMON NAME =    EP1       SIZE =      41
 00042   00000004

          COMMON NAME =    HT1       SIZE =      60
 00617   00000011

          COMMON NAME =    IN7       SIZE =      12
 00234   00000000

          COMMON NAME =    JN3       SIZE =      50
 01276   00000000
 01410   00000001
 00630   00000021
 00472   00000007
 00477   00000027
 01437   00000002
 00631   00000022
 00466   00000005
 00470   00000025
 01442   00000003
 00632   00000023
 01402   00000004

          COMMON NAME =    LI6       SIZE =      1
 00424   00000000

          COMMON NAME =    MNA       SIZE =      127
 01021   00000000

          COMMON NAME =    OA1       SIZE =      256
 00435   00000000
```

```
                     V57   HR MILLER  OJTEST-ATS OJ TEST MODULE                          V57
       1/08/74   TIME :  1:42 PM

        COMMON NAME =   OB1      SIZE =   256
 00433   00000000

        COMMON NAME =   WA1      SIZE =   550
 00456   00000040
 01461   00000001
 00444   00000041
 01453   00000076
 00050   00000022
 01456   00000077
 00063   00000023
 01355   00000027
 00311   00000030
 01447   00000031
 01347   00000026
 01351   00000025
 00633*  00000004
 01441   00000033
 00523   00000045
 00451   00000050
 00446   00000051
 00453   00000060
 01444   00000034
 00171   00000063
 01321   00000007
 01323   00000006
 01333   00000010
 01111   00000011
 00437   00000062
 00442   00000061
 00614   00000005
 00666   00000003

  SUBROUTINES

  01446  V57
  00001  V57X01
  00003  V57X02
  00005  V57X03
  00007  V57X04
  00011  V57X05
  00013  V57X06
  00015  V57X07
  00025  V95
  01460  V27
  00613  V32
  00511  V96
  01037  V01
  00640  F08
  01464  E01
  01113  E02
  01375  L00
  01300  V31
  00017  V57X08
  00057  T01
  01325  F72
  01025  L09
  01511   00000256    0915          END                                               00917


     0 UNDEFINED SYMBOLS
                          REFERENTS TO DEFINED SYMBOLS

 SYMBOL     VALUE        REFERENTS

   -       00000000     00121 LDA   00123 STA   00124 LDA   00126 STA   00130 LDA   00132 STA
                        00133 LDA   00135 STA   00156 LDA   00335 LDA   00440 LDA   00474 LDA
                        00537 LDA   00544 LDA   00733 LDA   01067 LDA   01130 LDA   01142 LDA
                        01150 LDA   01155 LDA   01161 LDA   01166 LDA   01173 LDA   01201 LDA
                        01207 LDA   01213 LDA   01220 LDA   01226 LDA   01231 LDA   01235 LDA

  AB01     00000756     00020 BSP   00035 BSP   00147 BSP   00204 BSP   00517 BSP   00562 BSP
                        00761 BZA   00770 BSP   01114 BSP
  A403     00000064     00105 BUN   01267 BUN
  A415     00000070     00041 BUN   00212 BUN   00321 BZA   00525 BUN

  B002     00000037     00033 BNA   00053 BUN
  B005     00000042     00346 BUN
  B007     00000046     00222 BUN
  B010     00000074     00036 BUN
  B011     00000106     00100 BPX
  B020     00000130     00120 BUN
  B030     00000136     00127 BUN

  CRPBTK   00000004     00042 LDA   00043 SRNZ
  CRPTRS   00000011     00617 STA
  CLLTSA   00000001     00217 LDA
  CLOTSB   00000000     00255 ANA   00256 LRA   01452 LLA
  CLOTSX   00000001     00231 ANA   00232 LRA
  CLOTSY   00000001     00241 ANA   00242 LRA
  CCA      00000000     00435 LDA
  CCP      00000000     00433 LDA
  CXLTSB   00000022     00047 ANA   00050 STA
  CXHTSG   00000023     00054 ANA   00055 STA   00063 LDQ

  D019     00000223     00040 BPA
  D020     00000214     00045 BUN
  D021     00000303     00276 BUN   00300 BUN
  D022     00000324     00307 BUN
  D023     00000304     00253 BPX   01327 BUN
  D030     00000413     00303 BUN
  D031     00000347     00345 BZA
  D032     00000342     00340 BUN
  D035     00000415     00417 IBN
  D050     00000435     00432 BZX
  D055     00000436     00434 BUN

  E020     00000527     00522 BUN
```

V57 HR MILLER DJTEST-ATS OJ TEST MODULE V57
1/08/74 TIME 1. 1:42 PM

| | | | | | | | | | | | | | |
|---|---|---|---|---|---|---|---|---|---|---|---|---|---|
| E030 | 00000544 | 00542 | BUN | | | | | | | | | | |
| FJN001 | 00000000 | 00203 | STX | 00333 | CAX | 00470 | CAX | 00506 | CAX | 00516 | STX | 00535 | CAX |
| | | 00573 | STX | 00602 | CAX | 00731 | CAX | 00767 | STX | 01270 | STX | 01276 | CAX |
| FJN002 | 00000001 | 00350 | STA | 00361 | CAX | 00627 | STA | 00660 | STA | 00503 | CAX | 00577 | CAX |
| | | 00622 | STA | 00635 | CAX | 00673 | STA | 00674 | CAX | 00742 | STA | 00743 | LDA |
| | | 01266 | LDA | 01400 | STA | 01410 | LDA | | | | | | |
| FJN003 | 00000002 | 00365 | STA | 00464 | STA | 00624 | STA | 00671 | STA | 01265 | LDQ | 01423 | STA |
| | | 01437 | LDA | | | | | | | | | | |
| FJN004 | 00000003 | 00604 | LDA | 00626 | STA | 01425 | STA | 01442 | LDA | | | | |
| FJN005 | 00000004 | 01402 | STA | | | | | | | | | | |
| FJN006 | 00000005 | 00466 | STA | | | | | | | | | | |
| FJN008 | 00000007 | 00354 | STA | 00472 | STA | | | | | | | | |
| FJN018 | 00000021 | 00352 | STA | 00462 | STA | 00630 | STA | | | | | | |
| FJN019 | 00000022 | 00366 | STA | 00473 | STX | 00631 | STX | | | | | | |
| FJN020 | 00000023 | 00632 | STX | | | | | | | | | | |
| FJN022 | 00000025 | 00410 | STA | | | | | | | | | | |
| FJN024 | 00000027 | 00356 | STA | 00477 | STA | | | | | | | | |
| FWA | 00000000 | 00046 | LDA | 00051 | LDA | 00220 | SMNZ | 00226 | LDA | 00240 | LDA | 00254 | LDA |
| | | 01453 | STA | 01456 | STA | | | | | | | | |
| FWACHT | 00000005 | 00614 | LDA | | | | | | | | | | |
| FWADIR | 00000006 | 00247 | EQU | 00250 | STA | 01322 | EQU | 01323 | STA | | | | |
| FWADNQ | 00000006 | 00257 | LDA | 01322 | LDA | | | | | | | | |
| FWAEID | 00000004 | 00316 | LDA | 00317 | ANA | 00320 | SUB | | | | | | |
| FWAELN | 00000001 | 00021 | LDA | 00024 | LDA | 00074 | LDA | 00136 | LDA | 00141 | LDA | 00172 | LDA |
| | | 00175 | LDA | 00454 | LDA | 00510 | LDA | 00551 | LDA | 00653 | LDA | 00664 | LDA |
| | | 01103 | LDA | 01277 | LDA | 01445 | LDA | 01457 | LDA | | | | |
| FWAERP | 00000003 | 00666 | STA | | | | | | | | | | |
| FWAINT | 00000010 | 00401 | STA | 00550 | STA | 00652 | STA | 00744 | STA | 01102 | STA | | |
| FWANPG | 00000001 | 00026 | STA | 00143 | STA | 00177 | STA | 00404 | STA | 00512 | STA | 00553 | STA |
| | | 00655 | STA | 00747 | STA | 01105 | STA | 01301 | STA | 01461 | STA | | |
| FWAPRL | 00000001 | 00021 | LDA | 00024 | LDA | 00074 | LDA | 00136 | LDA | 00141 | LDA | 00172 | LDA |
| | | 00175 | LDA | 00402 | LDA | 00454 | LDA | 00510 | LDA | 00551 | LDA | 00653 | LDA |
| | | 00664 | LDA | 00745 | LDA | 01103 | LDA | 01277 | LDA | 01445 | LDA | 01457 | LDA |
| FWARJI | 00000004 | 00357 | LDA | 00500 | LDA | 00574 | LDA | 00633 | LDA | | | | |
| FWARJN | 00000004 | 00103 | LDQ | | | | | | | | | | |
| FWATLR | 00000011 | 00405 | LDA | 00406 | ANA | 00407 | ORL | 00410 | STA | 00554 | LDA | 00555 | ANA |
| | | 00556 | ORL | 00557 | STA | 00656 | LDA | 00657 | ANA | 00660 | ORL | 00661 | STA |
| | | 00750 | LDA | 00751 | ANA | 00752 | ORL | 00753 | STA | 01106 | LDA | 01107 | ANA |
| | | 01110 | ORL | 01111 | STA | | | | | | | | |
| FWAW01 | 00000001 | 01432 | STA | | | | | | | | | | |
| FWAW25 | 00000031 | 01447 | STA | | | | | | | | | | |
| F012 | 00000566 | 00611 | BUN | 00766 | BUN | | | | | | | | |
| F014 | 00000567 | 01136 | BUN | | | | | | | | | | |
| F020 | 00000573 | 00546 | BUN | 00564 | BNA | | | | | | | | |
| F030 | 00000612 | 00607 | BUN | | | | | | | | | | |
| F031 | 00000664 | 00650 | BUN | | | | | | | | | | |
| F032 | 00000717 | 00710 | BUN | 00713 | BUN | | | | | | | | |
| F034 | 00000651 | 00647 | BZA | | | | | | | | | | |
| F035 | 00000711 | 00705 | BZA | 00707 | BZA | | | | | | | | |
| F040 | 00000741 | 00736 | BUN | | | | | | | | | | |
| F050 | 00000742 | 00740 | BUN | | | | | | | | | | |
| G003 | 00001055 | 01031 | BZA | | | | | | | | | | |
| G004 | 00001067 | 01045 | BPA | | | | | | | | | | |
| G005 | 00001032 | 00774 | BPA | 01030 | BZX | 01120 | BUN | | | | | | |
| G006 | 00001077 | 01333 | BUN | | | | | | | | | | |
| G010 | 00001130 | 01076 | BUN | | | | | | | | | | |
| G012 | 00001135 | 01054 | BUN | 01066 | BUN | 01127 | BUN | 01147 | BUN | 01165 | BUN | 01172 | BUN |
| | | 01200 | BUN | 01206 | BUN | 01222 | BUN | 01226 | BUN | 01233 | BUN | 01237 | BUN |
| G017 | 00001061 | 01057 | BZA | | | | | | | | | | |
| G021 | 00001137 | 01153 | BUN | | | | | | | | | | |
| G040 | 00001142 | 01072 | BUN | | | | | | | | | | |
| G050 | 00001150 | 01145 | BUN | | | | | | | | | | |
| G060 | 00001155 | 01141 | BUN | | | | | | | | | | |
| G070 | 00001166 | 01160 | BUN | | | | | | | | | | |
| G080 | 00001173 | 01075 | BZA | | | | | | | | | | |
| G090 | 00001201 | 01176 | BUN | | | | | | | | | | |
| G100 | 00001207 | 01204 | BUN | | | | | | | | | | |
| G110 | 00001231 | 01212 | BUN | 01216 | BUN | | | | | | | | |
| G120 | 00001305 | 01140 | BUN | 01163 | BUN | 01120 | BUN | 01227 | BUN | | | | |
| G121 | 00001241 | 01306 | BZA | 01366 | BUN | 01370 | BUN | | | | | | |
| G122 | 00001314 | 01310 | BZA | | | | | | | | | | |
| G123 | 00001330 | 01326 | BNX | | | | | | | | | | |
| G124 | 00001342 | 01334 | BUN | | | | | | | | | | |
| G125 | 00001121 | 01117 | BZA | | | | | | | | | | |
| G126 | 00001360 | 01064 | BZA | 01240 | BUN | 01317 | BUN | 01336 | BNA | 01343 | BZA | | |
| G127 | 00001367 | 01363 | BZA | 01365 | BZA | | | | | | | | |
| G128 | 00001405 | 01407 | BUN | | | | | | | | | | |
| G129 | 00001432 | 01435 | BUN | | | | | | | | | | |
| G131 | 00001436 | 01433 | IBP | | | | | | | | | | |
| G140 | 00001243 | 00373 | BNA | 00507 | BNA | 00603 | BNA | 00642 | BNA | | | | |
| G160 | 00001245 | 00764 | BUN | | | | | | | | | | |
| G170 | 00001247 | 00334 | BNA | 00341 | BUN | 00536 | BNA | 00543 | BUN | 00732 | BNA | 01016 | BNA |
| | | 01031 | BUN | 01041 | BNA | 01154 | BUN | | | | | | |
| G171 | 00001346 | 01313 | BUN | 01341 | BUN | | | | | | | | |
| G180 | 00001251 | 00040 | BZA | | | | | | | | | | |
| G181 | 00001254 | 00526 | BUN | | | | | | | | | | |
| G183 | 00001256 | 00213 | BUN | 01253 | BUN | | | | | | | | |
| G190 | 00001257 | 00073 | BUN | 00323 | BUN | 00572 | BUN | 01125 | BZA | 01242 | BUN | 01244 | BUN |
| | | 01246 | BUN | 01250 | BUN | 01357 | BUN | | | | | | |
| G192 | 00001410 | 01406 | IBP | | | | | | | | | | |
| G200 | 00001262 | 00701 | BUN | 01002 | BUN | | | | | | | | |
| G210 | 00001270 | 01261 | BUN | | | | | | | | | | |
| HLISW2 | 00000000 | 00223 | LDA | | | | | | | | | | |
| HLITGN | 00000000 | 00424 | LDA | 00425 | ANA | 00426 | LDA | | | | | | |
| HRN | 00000000 | 01021 | LDA | | | | | | | | | | |
| H010 | 00000272 | 00270 | BZA | | | | | | | | | | |
| H020 | 00000301 | 00271 | BUN | 00275 | BZA | | | | | | | | |
| H030 | 00000277 | 00044 | BUN | 00221 | BUN | 00225 | BNA | | | | | | |

V57 MR MILLER OJTEST-ATS OJ TEST MODULE V57

1/08/74 TIME : 1142 PM

| | | | | | | | |
|---|---|---|---|---|---|---|---|
| PC | 00000100 | 00675 CRR | 00776 CRR | 01024 CRR | 01272 CRR | 01372 CRR | |
| PV27A | 00000007 | 01457 LDA | 01462 LDA | | | | |
| PV31A | 00000007 | 01103 LDA | | | | | |
| PV57A | 00000007 | 00021 LDA | 00024 LDA | 00027 LDA | 00074 LDA | 00136 LDA | 00141 LDA |
| | | 00144 LDA | 00172 LDA | 00175 LDA | 00200 LDA | 00402 LDA | 00454 LDA |
| | | 00551 LDA | 00653 LDA | 00664 LDA | 00745 LDA | 01277 LDA | 01302 LDA |
| | | 01445 LDA | | | | | |
| PV96A | 00000003 | 00510 LDA | 00513 LDA | | | | |
| RA | 00000002 | 00104 CCR | 00111 CRR | 00113 CRR | 00113 CRR | 00233 CRR | 00237 CRR |
| | | 00243 CRR | 00243 CRR | 00260 CRR | 00312 CRR | 00327 CRR | 00360 CRR |
| | | 00414 CCR | 00423 CRR | 00430 CRR | 00501 CCR | 00532 CRR | 00575 CCR |
| | | 00615 CRR | 00616 CCR | 00634 CRR | 00667 CRR | 00726 CRR | 01012 CRR |
| | | 01070 CRR | 01022 CRR | 01024 CRR | 01026 CRR | 01035 CRR | 01077 CRR |
| | | 01404 CCR | 01431 CRR | | | | |
| RJFCTL | 00000004 | 00465 LDA | | | | | |
| RJFCTR | 00000000 | 00621 ANA | 00627 LDA | | | | |
| RJFCTT | 00000006 | 00353 LDA | 00355 LDA | 00471 LDA | 00476 LLA | | |
| RJFTRI | 00000002 | 00605 ANA | 00606 SLNE | 00625 LDA | | | |
| RJFXFB | 00000001 | 00463 LDA | 00623 LDA | | | | |
| RJFXFD | 00000000 | 00457 LDA | | | | | |
| RJFXIN | 00000000 | 00347 LDA | 00351 LDA | 00620 LDA | 00627 LDA | | |
| RLWABF | 00000020 | 00757 LDA | 00760 ANA | | | | |
| RLWAIA | 00000000 | 00124 CAX | 00332 CAX | 00527 CAX | 01032 CAX | | |
| RLWBFZ | 00000004 | 01062 ANA | | | | | |
| RLWB7Z | 00000004 | 01061 LDA | 01062 ANA | 01063 SUB | | | |
| RLWCCR | 00000005 | 01224 LDA | 01225 SRNZ | | | | |
| RLWCCT | 00000005 | 01220 LDA | 01221 SRNZ | | | | |
| RLWCRR | 00000005 | 01235 LDA | 01236 SRNZ | | | | |
| RLWCRT | 00000005 | 01231 LDA | 01232 SRNZ | | | | |
| RLWCSK | 00000022 | 00711 LDA | 00712 SMNT | 01073 LDA | 01074 ANA | 01115 LDA | 01116 ANA |
| RLWCTT | 00000022 | 00272 LDA | 00273 ANA | 00274 SUB | 00474 LDA | 00475 ANA | 00476 LLA |
| | | 01155 LDA | 01156 ANA | 01157 SRNE | 01213 LDA | 01214 ANA | 01215 SRNE |
| | | 01420 LDA | 01421 STA | | | | |
| RLWDTZ | 00000004 | 01062 ANA | | | | | |
| RLWG02 | 00000006 | 00717 LDA | 00720 ORA | 00721 STA | 00723 CAX | | |
| RLWG03 | 00000006 | 01003 LDA | 01004 ORA | 01005 STA | 01007 CAX | | |
| RLWG04 | 00000006 | 00714 LDA | 00715 ORA | 00716 STA | | | |
| RLWHZZ | 00000004 | 01161 LDA | 01162 SRNZ | 01166 LDA | 01167 SRNT | | |
| RLWINT | 00000000 | 01055 LDA | 01056 ANA | 01142 LDA | 01143 ANA | 01144 SRNE | 01173 LDA |
| | | 01174 ANA | 01175 SRNE | | | | |
| RLWJK1 | 00000022 | 01367 SMNN | | | | | |
| RLWJK2 | 00000023 | 01137 SMNN | | | | | |
| RLWJK3 | 00000024 | 00214 STX | 00302 STA | 01335 LDA | 01342 LDA | | |
| RLWK4 | 00000025 | 00216 STX | 00264 ADM | 01307 LDA | | | |
| RLWKS | 00000026 | 00230 STA | 00257 ADM | 01330 CAX | 01352 CAX | 01401 LDA | 01405 STA |
| | | 01450 LDA | 01454 LDA | | | | |
| RLWMIN | 00000006 | 01426 LDA | 01427 STA | | | | |
| RLWRFT | 00000021 | 00544 LDA | 00545 SLNT | 00563 LDA | | | |
| RLWRJS | 00000017 | 00034 STX | 00643 SOM | 01417 STA | | | |
| RLWSOA | 00000007 | 00133 LDA | 00134 ORA | 00135 STA | | | |
| RLWSOB | 00000007 | 00124 LDA | 00125 ORA | 00126 STA | | | |
| RLWSRI | 00000015 | 01416 STA | | | | | |
| RLWSRS | 00000016 | 01415 STA | | | | | |
| RLWSSX | 00000000 | 00335 LDA | 00336 ANA | 00337 SRNE | 00537 LDA | 00540 ANA | 00541 SRNE |
| | | 01046 LDA | 01047 ANA | 01050 SUB | 01130 LDA | 01131 ANA | 01132 SRNE |
| | | 01150 LDA | 01151 ANA | 01152 SRNE | 01201 LDA | 01202 ANA | 01203 SRNE |
| RLWSTA | 00000007 | 00130 LDA | 00131 ORA | 00132 STA | | | |
| RLWSTB | 00000007 | 00121 LDA | 00122 ORA | 00123 STA | | | |
| RLWSTM | 00000006 | 00265 LDA | 00266 ANA | 00267 SUB | 00342 LDA | 00343 ANA | 00344 SUB |
| | | 00644 LDA | 00645 ANA | 00646 SUB | 00702 LDA | 00703 ANA | 00704 SUB |
| | | 00706 SUB | 00733 LDA | 00734 ANA | 00735 SRNE | 00771 LDA | 00772 ANA |
| | | 00773 SUB | 01042 LDA | 01043 ANA | 01044 SUB | 01067 LDA | 01070 ANA |
| | | 01071 SRNE | 01121 LDA | 01122 ANA | 01123 SUB | 01207 LDA | 01210 ANA |
| | | 01211 SRNE | 01314 LDA | 01315 ANA | 01316 SANE | 01360 LDA | 01361 ANA |
| | | 01362 SUB | 01364 SUB | 01426 LDA | | | |
| RLWSTO | 00000007 | 00112 LLA | 00114 STA | | | | |
| RLWWAS | 00000014 | 00372 CAX | 00641 CAX | 01015 CAX | 01027 CAX | 01040 CAX | 01262 CAX |
| | | 01376 CAX | 01413 STX | 01436 CAX | | | |
| RLWWI3 | 00000015 | 00215 STX | 00246 STA | 00277 STX | 00310 LDA | 01305 LDA | 01320 LDA |
| | | 01346 LDA | | | | | |
| RLWXMS | 00000023 | 00106 LDA | 00107 ANA | 00110 LRA | 00156 LDA | 00157 ANA | 00440 LDA |
| | | 00441 ANA | 00445 LDA | 01377 LDA | 01412 STA | | |
| RQ | 00000004 | 00237 CRR | 00243 CRR | 00362 CRR | 00675 CRR | 00776 CRR | 01020 CRR |
| | | 01026 CRR | 01257 CRR | 01272 CRR | 01372 CRR | | |
| SL675 | 00000162 | 00672 LDA | 00775 LDA | 01017 LDA | 01271 LDA | 01371 LDA | |
| STILOC | 00104400 | 00160 ADD | | | | | |
| TINGSA | 00000000 | 00234 LDA | 00235 ANA | | | | |
| TWAACT | 00000010 | 00263 SMNT | 01333 SMNT | | | | |
| TWAGSA | 00000007 | 00245 STA | 01321 STA | | | | |
| T010 | 00000565 | 00565 LDQ | 00565 LDQ | | | | |
| T020 | 00000610 | 00610 LDQ | 00610 LDQ | | | | |
| T030 | 00001134 | 01134 LDQ | 01134 LDQ | | | | |
| T040 | 00001065 | 01065 LDQ | 01065 LDQ | | | | |
| T050 | 00000765 | 00763 BNA | | | | | |
| T060 | 00001146 | 01146 LDQ | 01146 LDQ | | | | |
| T080 | 00001164 | 01164 LDQ | 01164 LDQ | | | | |
| T090 | 00001171 | 01171 LDQ | 01171 LDQ | | | | |
| T100 | 00001177 | 01177 LDQ | 01177 LDQ | | | | |
| T110 | 00001205 | 01205 LDQ | 01205 LDQ | | | | |
| T120 | 00001217 | 01217 LDQ | 01217 LDQ | | | | |
| T130 | 00001223 | 01223 LDQ | 01223 LDQ | | | | |
| T140 | 00001230 | 01230 LDQ | 01230 LDQ | | | | |
| T150 | 00001234 | 01234 LDQ | 01234 LDQ | | | | |
| T160 | 00001052 | 01060 BUN | | | | | |
| T170 | 00001126 | 01126 LDQ | 01126 LDQ | | | | |
| T190 | 00000374 | 00374 LDA | 00374 LDA | | | | |

```
                    V57  HR MILLER  OJTEST-ATS OJ TEST MODULE                    V57
      1/08/74     TIME : 1142 PM  ,

T200      00001311      01311  LDA      01311  LDA
T210      00001344      01344  LDA      01344  LDA
T220      00001337      01337  LDA      01337  LDA

VWBABG    00000034      01453  ANA
VWBBUN    00000033      01422  LDA      01440  ANA      01441  STA
VWBBUO    00000034      00170  ANA      01424  LDA      01443  ANA
VWBCPG    00000040      00023  STA
VWBFAL    00000041      00032  LDA
VWBHTX    00000034      00166  LDA      01443  ANA      01444  STA
VWBJFJ    00000041      00017  ANA
VWBRUN    00000034      00167  ANA
VWBSNS    00000033      01440  ANA
VWBSEC    00000033      00115  LDA      00116  ANA      00117  SRNE     00153  LDA      00154  ANA      00162  LDA
                        00163  ANA      00421  LDA      00422  ANA      00447  LDA      00450  ANA      01440  ANA
VWBTLT    00000041      00037  ANA
VWFCPG    00000040      00174  STA      00415  STA      00456  STA
VWFI03    00000062      00437  STA
VWFINH    00000045      00150  LDA      00151  ORA      00152  STA
VWFIN3    00000060      00164  ADD      00165  STA      00452  ADD
VWFL3X    00000063      00171  STA
VWFRIS    00000041      00443  LDA      00444  STA
VWFRI3    00000060      00452  ADD
VWFSF1    00000050      00155  STA      00451  STA
VWFSF3    00000060      00453  STA
VWFS10    00000051      00160  EQU
VWFS11    00000051      00160  EQU
VWFS1U    00000051      00160  EQU
VWFS1X    00000051      00161  STA      00446  STA
VWFS3X    00000061      00442  STA
VWFTAB    00000045      00205  LDA      00206  SLNZ     00520  LDA      00521  SLNZ
VWFTRE    00000045      00210  LDA      00211  SLNT     00523  LDA      00524  SLNT
VWNCRT    00000077      01100  STA      01260  STQ
VWNKEY    00000030      00064  STQ      00311  STA
VWNNOE    00000025      00071  LDQ      00314  LDA      00315  STA      01350  LDA      01351  STA
VWNPLY    00000031      00065  STA      00140  STA      00313  STA
VWNPOT    00000027      00062  STQ      00102  STQ      00307  STA      01264  STQ      01355  STA
VWNPRO    00000076      00067  STQ      00305  STA      01347  STA
VWNSPI    00000025      00071  LDQ      00072  STQ      00376  LDA      00377  STA      00566  LDA      00571  STA
                        01135  LDA      01252  LDA      01255  LDA      01256  STA
VWNTKN    00000076      00374  LDA      00375  STA      00565  LDQ      00567  STQ      00610  LDQ      00765  LDQ
                        01052  LDA      01053  STA      01065  LDQ      01126  LDQ      01134  LDQ      01146  LDQ
                        01164  LDQ      01171  LDQ      01177  LDQ      01205  LDQ      01217  LDQ      01223  LDQ
                        01230  LDQ      01234  LDQ      01311  LDA      01312  STA      01337  LDA      01340  STA
                        01344  LDA      01345  STA
V57X      00000000      00000  PROGCD
V57X01    00000020      00000  PROGCD
V57X02    00000032      00000  PROGCD
V57X03    00000147      00000  PROGCD
V57X04    00000203      00000  PROGCD
V57X05    00000516      00000  PROGCD

V57X06    00000562      00000  PROGCD
V57X07    00000767      00000  PROGCD
V57X08    00001114      00000  ETC

X1        00000010      00360  CRR      00501  CCR      00575  CCR      00634  CRR      00667  CRR

X2        00000020      00111  CRR      00113  CRR      00312  CRR      00623  CRR      00615  CRR      01020  CRR
                        01022  CRR
X3        00000040      00233  CRR      00260  CRR      00430  CRR      01257  CRR
***************         0 LINES FLAGGED IN THIS ASSEMBLY


*ODAP/360   A C C O U N T I N G   I N F O R M A T I O N          D A T E :  1/08/74
******************************************************************************
       *****    PROGRAMMER   NAME   *****
       ***      672HMV57  MILLER      ***
       ***      ASMT-NO.    : 31276   ***
       ***      TASK-NO.    =   798   ***
       ***      SORT-NO.    =    04   ***
       *** NO. OF LINES PRINTED = 2125***
       *** NO. OF CARDS READ    =  917***
       *** NO. OF CARDS PUNCHED =   65***
       *** C.P.U. TIME IS   0152.10   WALL TIME IS  105118
```

What is claimed is:

1. In a communication switching system having a switching network for establishing connections between calling and called lines in response to common equipment and having a plurality of space-divided equipment units communicating with the common equipment for performing control operations, the common equipment including scanning means for monitoring the space-divided equipment units, each one of the space-divided equipment units including a supervisory device for generating a supervisory signal and for supplying it to said scanning means, a method of in-circ testing of space-divided equipment devices, comp ing:

providing testing means for controlling one of space-divided equipment devices under test;

establishing a test connection through the netw between said testing means and the device un test;

causing said testing means to control the operatio the device under test and thus to control the ge ation of its supervisory signal for testing purpo causing said scanning means to sense the supervisory signal of the device under test; and determining whether the device under test is able to operate properly in response to said scanning means.

2. A method according to claim 1, wherein said supervisory signal is ticketing information.

3. A method according to claim 2, wherein said space-divided equipment units comprise junctors.

4. In a communication switching system having a switching network for establishing connections between calling and called lines in response to common equipment and having a plurality of space-divided equipment units communicating with the common equipment for performing control operations, the common equipment including scanning means for monitoring the space-divided equipment units, each one of the space-divided equipment units including a supervisory device for generating a supervisory signal and for supplying it to said scanning means, an apparatus for in-circuit testing of the space-divided equipment devices, comprising:

testing means for controlling one of the space-divided equipment devices under test;

means for establishing a test connection through the network between said testing means and the device under test;

means for causing said testing means to control the operation of the device under test and thus to control the generation of its supervisory signal for testing purposes;

means for causing said scanning means to sense the supervisory signal of the device under test; and means for determining whether the device under test is able to operate properly in response to said scanning means.

5. An apparatus according to claim 4, wherein said supervisory signal is ticketing information.

6. An apparatus according to claim 5, wherein said space-divided equipment units comprise junctors.

* * * * *